US009842005B2

(12) United States Patent
Abdallah

(10) Patent No.: US 9,842,005 B2
(45) Date of Patent: Dec. 12, 2017

(54) REGISTER FILE SEGMENTS FOR SUPPORTING CODE BLOCK EXECUTION BY USING VIRTUAL CORES INSTANTIATED BY PARTITIONABLE ENGINES

(75) Inventor: Mohammad Abdallah, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 365 days.

(21) Appl. No.: 13/428,438

(22) Filed: Mar. 23, 2012

(65) Prior Publication Data

US 2012/0246450 A1    Sep. 27, 2012

Related U.S. Application Data

(60) Provisional application No. 61/467,939, filed on Mar. 25, 2011.

(51) Int. Cl.
*G06F 9/30* (2006.01)
*G06F 9/38* (2006.01)
(Continued)

(52) U.S. Cl.
CPC ........ *G06F 9/5077* (2013.01); *G06F 9/30043* (2013.01); *G06F 9/30123* (2013.01);
(Continued)

(58) Field of Classification Search
CPC .... G06F 9/3836; G06F 9/3851; G06F 9/3885; G06F 9/3838; G06F 9/3867;
(Continued)

(56) References Cited

U.S. PATENT DOCUMENTS

| 727,487 A | 5/1903 | Swan |
|---|---|---|
| 4,075,704 A | 2/1978 | O'Leary |

(Continued)

FOREIGN PATENT DOCUMENTS

| CA | 1848095 A | 10/2006 |
|---|---|---|
| CN | 1214666 A | 4/1999 |

(Continued)

OTHER PUBLICATIONS

Rixner et al., "Register Organization for Media Processing", IEEE, 2000.*

(Continued)

*Primary Examiner* — Benjamin Geib
(74) *Attorney, Agent, or Firm* — Nicholson De Vos Webster & Elliott LLP

(57) ABSTRACT

A system for executing instructions using a plurality of register file segments for a processor. The system includes a global front end scheduler for receiving an incoming instruction sequence, wherein the global front end scheduler partitions the incoming instruction sequence into a plurality of code blocks of instructions and generates a plurality of inheritance vectors describing interdependencies between instructions of the code blocks. The system further includes a plurality of virtual cores of the processor coupled to receive code blocks allocated by the global front end scheduler, wherein each virtual core comprises a respective subset of resources of a plurality of partitionable engines, wherein the code blocks are executed by using the partitionable engines in accordance with a virtual core mode and in accordance with the respective inheritance vectors. A plurality register file segments are coupled to the partitionable engines for providing data storage.

24 Claims, 24 Drawing Sheets

(51) Int. Cl.
*G06F 9/50* (2006.01)
*G06F 12/08* (2016.01)
*G06F 13/16* (2006.01)
*G06F 12/0846* (2016.01)

(52) U.S. Cl.
CPC .......... *G06F 9/3834* (2013.01); *G06F 9/3836* (2013.01); *G06F 9/3838* (2013.01); *G06F 9/505* (2013.01); *G06F 9/5016* (2013.01); *G06F 12/0848* (2013.01); *G06F 13/1657* (2013.01); *G06F 2212/282* (2013.01)

(58) Field of Classification Search
CPC .... G06F 9/4553; G06F 9/5077; G06F 9/4881; G06F 9/4843; G06F 9/505; G06F 9/5083; G06F 9/3834; G06F 9/30123
USPC .............. 712/219, 214–216; 718/1, 102, 105
See application file for complete search history.

(56) References Cited

U.S. PATENT DOCUMENTS

| | | |
|---|---|---|
| 4,245,344 A | 1/1981 | Richter |
| 4,356,550 A | 10/1982 | Katzman et al. |
| 4,414,624 A | 11/1983 | Summer, Jr. et al. |
| 4,524,415 A | 6/1985 | Mills, Jr. et al. |
| 4,527,237 A | 7/1985 | Frieder et al. |
| 4,577,273 A | 3/1986 | Hopper et al. |
| 4,597,061 A | 6/1986 | Cline et al. |
| 4,600,986 A | 7/1986 | Scheuneman et al. |
| 4,633,434 A | 12/1986 | Scheuneman |
| 4,682,281 A | 7/1987 | Woffinden et al. |
| 4,727,487 A | 2/1988 | Masui et al. |
| 4,816,991 A | 3/1989 | Watanabe et al. |
| 4,835,680 A | 5/1989 | Hogg et al. |
| 4,920,477 A | 4/1990 | Colwell et al. |
| 4,930,066 A | 5/1990 | Yokota |
| 4,943,909 A | 7/1990 | Huang |
| 5,197,130 A | 3/1993 | Chen et al. |
| 5,294,897 A | 3/1994 | Notani et al. |
| 5,317,705 A | 5/1994 | Gannon et al. |
| 5,317,754 A | 5/1994 | Blandy et al. |
| 5,339,398 A | 8/1994 | Shah et al. |
| 5,404,470 A | 4/1995 | Miyake |
| 5,469,376 A | 11/1995 | Abdallah |
| 5,471,593 A | 11/1995 | Branigin |
| 5,509,130 A | 4/1996 | Trauben et al. |
| 5,517,651 A | 5/1996 | Huck et al. |
| 5,524,090 A | 6/1996 | Iwamura |
| 5,548,742 A | 8/1996 | Wang et al. |
| 5,559,986 A | 9/1996 | Alpert et al. |
| 5,574,878 A | 11/1996 | Onodera et al. |
| 5,581,725 A | 12/1996 | Nakayama |
| 5,634,068 A | 5/1997 | Nishtala et al. |
| 5,649,136 A | 7/1997 | Shen et al. |
| 5,675,759 A | 10/1997 | Shebanow et al. |
| 5,699,537 A | 12/1997 | Sharangpani et al. |
| 5,710,902 A | 1/1998 | Sheaffer et al. |
| 5,724,565 A | 3/1998 | Dubey et al. |
| 5,751,982 A | 5/1998 | Morley |
| 5,752,260 A | 5/1998 | Liu |
| 5,754,818 A | 5/1998 | Mohamed |
| 5,761,476 A | 6/1998 | Martell |
| 5,787,494 A | 7/1998 | Delano et al. |
| 5,793,941 A | 8/1998 | Pencis et al. |
| 5,802,602 A | 9/1998 | Rahman et al. |
| 5,806,085 A | 9/1998 | Berliner |
| 5,813,031 A | 9/1998 | Chou et al. |
| 5,819,088 A | 10/1998 | Reinders |
| 5,829,028 A | 10/1998 | Lynch et al. |
| 5,835,951 A | 11/1998 | McMahan |
| 5,852,738 A | 12/1998 | Bealkowski et al. |
| 5,860,146 A | 1/1999 | Vishin et al. |
| 5,864,657 A | 1/1999 | Stiffler |
| 5,872,985 A | 2/1999 | Kimura |
| 5,881,277 A | 3/1999 | Bondi et al. |
| 5,901,294 A | 5/1999 | Tran et al. |
| 5,903,750 A | 5/1999 | Yeh et al. |
| 5,905,509 A | 5/1999 | Jones et al. |
| 5,911,057 A | 6/1999 | Shiell |
| 5,918,251 A | 6/1999 | Yamada et al. |
| 5,956,753 A | 9/1999 | Glew et al. |
| 5,974,506 A | 10/1999 | Sicola et al. |
| 5,983,327 A | 11/1999 | Achilles et al. |
| 6,016,533 A | 1/2000 | Tran |
| 6,016,540 A | 1/2000 | Zaidi et al. |
| 6,021,484 A | 2/2000 | Park |
| 6,065,105 A | 5/2000 | Zaidi et al. |
| 6,073,230 A | 6/2000 | Pickett et al. |
| 6,075,938 A | 6/2000 | Bugnion et al. |
| 6,088,780 A | 7/2000 | Yamada et al. |
| 6,092,172 A | 7/2000 | Nishimoto et al. |
| 6,101,577 A | 8/2000 | Tran |
| 6,108,769 A | 8/2000 | Chinnakonda et al. |
| 6,115,809 A | 9/2000 | Mattson, Jr. et al. |
| 6,134,634 A | 10/2000 | Marshall, Jr. et al. |
| 6,138,226 A | 10/2000 | Yoshioka et al. |
| 6,157,998 A | 12/2000 | Rupley, II et al. |
| 6,167,490 A | 12/2000 | Levy et al. |
| 6,170,051 B1 | 1/2001 | Dowling |
| 6,178,482 B1 | 1/2001 | Sollars |
| 6,185,660 B1 | 2/2001 | Mulla et al. |
| 6,205,545 B1 | 3/2001 | Shah et al. |
| 6,209,085 B1 | 3/2001 | Hammond et al. |
| 6,212,542 B1 | 4/2001 | Kahle et al. |
| 6,212,613 B1 | 4/2001 | Belair |
| 6,216,215 B1 | 4/2001 | Palanca et al. |
| 6,226,732 B1 | 5/2001 | Pei et al. |
| 6,247,097 B1 | 6/2001 | Sinharoy |
| 6,253,316 B1 | 6/2001 | Tran et al. |
| 6,256,727 B1 | 7/2001 | McDonald |
| 6,256,728 B1 | 7/2001 | Witt et al. |
| 6,260,131 B1 | 7/2001 | Kikuta et al. |
| 6,260,138 B1 | 7/2001 | Harris |
| 6,269,439 B1 | 7/2001 | Hanaki |
| 6,272,616 B1 | 8/2001 | Fernando et al. |
| 6,272,662 B1 | 8/2001 | Jadav et al. |
| 6,275,917 B1 | 8/2001 | Okada |
| 6,282,583 B1 | 8/2001 | Pincus et al. |
| 6,282,638 B1 | 8/2001 | Dowling |
| 6,308,323 B1 | 10/2001 | Douniwa |
| 6,321,298 B1 | 11/2001 | Hubis |
| 6,327,650 B1 | 12/2001 | Bapst et al. |
| 6,332,189 B1 | 12/2001 | Baweja et al. |
| 6,339,822 B1 | 1/2002 | Miller |
| 6,341,324 B1 | 1/2002 | Caulk, Jr. et al. |
| 6,345,357 B1 | 2/2002 | Sato |
| 6,360,311 B1 | 3/2002 | Zandveld et al. |
| 6,408,367 B2 | 6/2002 | Achilles et al. |
| 6,437,789 B1 | 8/2002 | Tidwell et al. |
| 6,449,671 B1 | 9/2002 | Patkar et al. |
| 6,457,120 B1 | 9/2002 | Sinharoy |
| 6,473,833 B1 | 10/2002 | Arimilli et al. |
| 6,490,673 B1 | 12/2002 | Heishi et al. |
| 6,502,187 B1 | 12/2002 | Miyagawa |
| 6,529,928 B1 | 3/2003 | Resnick et al. |
| 6,542,984 B1 | 4/2003 | Keller et al. |
| 6,557,083 B1 | 4/2003 | Sperber et al. |
| 6,557,095 B1 | 4/2003 | Henstrom |
| 6,594,755 B1 | 7/2003 | Nuechterlein et al. |
| 6,604,187 B1 | 8/2003 | McGrath et al. |
| 6,609,189 B1 | 8/2003 | Kuszmaul et al. |
| 6,615,340 B1 | 9/2003 | Wilmot, II |
| 6,658,549 B2 | 12/2003 | Wilson et al. |
| 6,668,316 B1 | 12/2003 | Gorshtein et al. |
| 6,681,395 B1 | 1/2004 | Nishi |
| 6,704,860 B1 | 3/2004 | Moore |
| 6,721,874 B1 | 4/2004 | Le et al. |
| 6,728,866 B1 | 4/2004 | Kahle et al. |
| 6,775,761 B2 | 8/2004 | Wang et al. |
| 6,829,698 B2 | 12/2004 | Arimilli et al. |
| 6,882,177 B1 | 4/2005 | Reddy et al. |
| 6,907,600 B2 | 6/2005 | Neiger et al. |
| 6,912,644 B1 | 6/2005 | O'Connor et al. |

(56) References Cited

U.S. PATENT DOCUMENTS

| | | |
|---|---|---|
| 6,920,530 B2 | 7/2005 | Musumeci |
| 6,944,744 B2 | 9/2005 | Ahmed et al. |
| 6,948,172 B1 | 9/2005 | D'Souza |
| 6,950,927 B1 | 9/2005 | Apisdorf et al. |
| 6,954,846 B2 | 10/2005 | Leibholz et al. |
| 6,985,591 B2 | 1/2006 | Graunke |
| 6,988,183 B1 | 1/2006 | Wong |
| 7,007,108 B2 | 2/2006 | Emerson et al. |
| 7,020,879 B1 | 3/2006 | Nemirovsky et al. |
| 7,047,322 B1 | 5/2006 | Bauman et al. |
| 7,111,145 B1 | 9/2006 | Chen et al. |
| 7,117,347 B2 | 10/2006 | Col et al. |
| 7,139,855 B2 | 11/2006 | Armstrong et al. |
| 7,143,273 B2 | 11/2006 | Miller et al. |
| 7,149,872 B2 | 12/2006 | Rozas et al. |
| 7,150,021 B1 | 12/2006 | Vajjhala et al. |
| 7,171,535 B2 | 1/2007 | Naoi |
| 7,206,925 B1 | 4/2007 | Jacobson et al. |
| 7,213,106 B1 | 5/2007 | Koster et al. |
| 7,213,248 B2 | 5/2007 | Arimilli et al. |
| 7,231,106 B2 | 6/2007 | Basavanhally et al. |
| 7,257,695 B2 | 8/2007 | Jiang et al. |
| 7,278,030 B1 | 10/2007 | Chen et al. |
| 7,284,092 B2 | 10/2007 | Nunamaker et al. |
| 7,290,261 B2 * | 10/2007 | Burky et al. ............... 718/107 |
| 7,313,775 B2 | 12/2007 | Casey et al. |
| 7,343,476 B2 | 3/2008 | Floyd et al. |
| 7,373,637 B2 | 5/2008 | DeWitt, Jr. et al. |
| 7,380,096 B1 | 5/2008 | Rozas et al. |
| 7,383,427 B2 | 6/2008 | Yamazaki |
| 7,398,347 B1 | 7/2008 | Pechanek et al. |
| 7,406,581 B2 | 7/2008 | Southwell et al. |
| 7,418,579 B2 | 8/2008 | Guibert et al. |
| 7,418,582 B1 | 8/2008 | Iacobovici et al. |
| 7,493,475 B2 | 2/2009 | Colavin |
| 7,539,879 B2 | 5/2009 | Terechko et al. |
| 7,546,420 B1 | 6/2009 | Shar et al. |
| 7,577,820 B1 | 8/2009 | Wentzlaff et al. |
| 7,634,637 B1 | 12/2009 | Lindholm et al. |
| 7,647,483 B2 | 1/2010 | Bates et al. |
| 7,680,988 B1 | 3/2010 | Nickolls et al. |
| 7,681,019 B1 | 3/2010 | Favor |
| 7,707,578 B1 | 4/2010 | Zedlewski et al. |
| 7,711,929 B2 * | 5/2010 | Burky et al. ............... 712/217 |
| 7,716,460 B2 | 5/2010 | Stempel et al. |
| 7,757,065 B1 | 7/2010 | Jourdan et al. |
| 7,770,161 B2 * | 8/2010 | Mitran et al. ............... 717/151 |
| 7,783,868 B2 | 8/2010 | Ukai |
| 7,783,869 B2 | 8/2010 | Grandou et al. |
| 7,809,925 B2 * | 10/2010 | Mejdrich et al. ............... 712/7 |
| 7,848,129 B1 | 12/2010 | Deshpande et al. |
| 7,856,530 B1 | 12/2010 | Mu |
| 7,861,060 B1 | 12/2010 | Nickolls et al. |
| 7,877,582 B2 | 1/2011 | Gschwind et al. |
| 7,913,058 B2 | 3/2011 | Rozas et al. |
| 7,925,869 B2 | 4/2011 | Kelsey et al. |
| 8,044,951 B1 | 10/2011 | Brown et al. |
| 8,046,775 B2 | 10/2011 | Kang et al. |
| 8,082,420 B2 | 12/2011 | Comparan et al. |
| 8,108,545 B2 | 1/2012 | Arimilli et al. |
| 8,145,844 B2 | 3/2012 | Bruce |
| 8,145,880 B1 | 3/2012 | Cismas et al. |
| 8,145,882 B1 | 3/2012 | Kishore et al. |
| 8,200,949 B1 | 6/2012 | Tarjan et al. |
| 8,219,996 B1 | 7/2012 | Morris |
| 8,230,423 B2 | 7/2012 | Frigo et al. |
| 8,239,656 B2 | 8/2012 | Rozas et al. |
| 8,301,847 B2 | 10/2012 | Dantzig et al. |
| 8,316,435 B1 | 11/2012 | Varadhan et al. |
| 8,327,115 B2 | 12/2012 | Abdallah |
| 8,438,366 B2 | 5/2013 | Akizuki et al. |
| 8,522,253 B1 | 8/2013 | Rozas et al. |
| 8,539,486 B2 | 9/2013 | Cain, III et al. |
| 8,645,965 B2 | 2/2014 | Zimmer et al. |
| 8,756,329 B2 | 6/2014 | Reynolds et al. |
| 8,868,838 B1 | 10/2014 | Glasco et al. |
| 8,930,674 B2 | 1/2015 | Avudaiyappan et al. |
| 9,047,178 B2 | 6/2015 | Talagala et al. |
| 9,135,003 B2 | 9/2015 | Suh et al. |
| 2001/0016901 A1 | 8/2001 | Topham |
| 2001/0032303 A1 | 10/2001 | Pechanek et al. |
| 2001/0049782 A1 | 12/2001 | Hsu et al. |
| 2002/0029308 A1 | 3/2002 | Babaian et al. |
| 2002/0062435 A1 | 5/2002 | Nemirovsky et al. |
| 2002/0069326 A1 | 6/2002 | Richardson et al. |
| 2002/0082824 A1 | 6/2002 | Neiger et al. |
| 2002/0099913 A1 | 7/2002 | Steely et al. |
| 2002/0126657 A1 | 9/2002 | Frouin et al. |
| 2002/0129085 A1 | 9/2002 | Kubala et al. |
| 2002/0174321 A1 | 11/2002 | John et al. |
| 2002/0188833 A1 | 12/2002 | Henry et al. |
| 2003/0035422 A1 | 2/2003 | Hill |
| 2003/0065887 A1 | 4/2003 | Maiyuran et al. |
| 2003/0088752 A1 | 5/2003 | Harman |
| 2003/0093776 A1 | 5/2003 | Hilton |
| 2003/0101322 A1 | 5/2003 | Gardner |
| 2003/0101444 A1 | 5/2003 | Wu et al. |
| 2003/0126408 A1 | 7/2003 | Vajapeyam et al. |
| 2003/0131335 A1 | 7/2003 | Hamlin |
| 2003/0149862 A1 | 8/2003 | Kadambi |
| 2003/0163642 A1 | 8/2003 | Borkenhagen et al. |
| 2003/0169626 A1 | 9/2003 | Burk et al. |
| 2003/0200396 A1 | 10/2003 | Musumeci |
| 2003/0200412 A1 | 10/2003 | Peinado et al. |
| 2003/0202530 A1 | 10/2003 | Jenkins et al. |
| 2003/0225938 A1 | 12/2003 | Glasco et al. |
| 2003/0226001 A1 | 12/2003 | Moyer et al. |
| 2003/0233394 A1 | 12/2003 | Rudd et al. |
| 2004/0034762 A1 | 2/2004 | Kacevas |
| 2004/0044850 A1 | 3/2004 | George et al. |
| 2004/0064668 A1 | 4/2004 | Kjos et al. |
| 2004/0073909 A1 | 4/2004 | Arimilli et al. |
| 2004/0078538 A1 | 4/2004 | Dutt et al. |
| 2004/0093483 A1 | 5/2004 | Nguyen et al. |
| 2004/0098567 A1 | 5/2004 | Hansen et al. |
| 2004/0103251 A1 | 5/2004 | Alsup |
| 2004/0117593 A1 | 6/2004 | Uhlig et al. |
| 2004/0117594 A1 | 6/2004 | Vanderspek |
| 2004/0122887 A1 | 6/2004 | MacY |
| 2004/0138857 A1 | 7/2004 | Souza et al. |
| 2004/0139441 A1 | 7/2004 | Kaburaki et al. |
| 2004/0143727 A1 | 7/2004 | McDonald |
| 2004/0158822 A1 | 8/2004 | Sandham et al. |
| 2004/0187123 A1 | 9/2004 | Tremblay et al. |
| 2004/0193857 A1 | 9/2004 | Miller et al. |
| 2004/0205296 A1 | 10/2004 | Bearden |
| 2004/0215886 A1 | 10/2004 | Cargnoni et al. |
| 2004/0216105 A1 | 10/2004 | Burky et al. |
| 2004/0216120 A1 | 10/2004 | Burky et al. |
| 2004/0225872 A1 | 11/2004 | Bonanno et al. |
| 2005/0005085 A1 | 1/2005 | Miyanaga |
| 2005/0027961 A1 | 2/2005 | Zhang |
| 2005/0044547 A1 | 2/2005 | Gipp |
| 2005/0055504 A1 | 3/2005 | Hass et al. |
| 2005/0060457 A1 | 3/2005 | Olukotun |
| 2005/0066131 A1 | 3/2005 | Biles et al. |
| 2005/0108480 A1 | 5/2005 | Correale, Jr. et al. |
| 2005/0108715 A1 | 5/2005 | Kanai et al. |
| 2005/0114603 A1 | 5/2005 | Buti et al. |
| 2005/0120191 A1 | 6/2005 | Akkary et al. |
| 2005/0120194 A1 | 6/2005 | Kissell |
| 2005/0132145 A1 | 6/2005 | Dybsetter et al. |
| 2005/0154867 A1 | 7/2005 | Dewitt et al. |
| 2005/0204118 A1 | 9/2005 | Jen et al. |
| 2005/0216920 A1 * | 9/2005 | Tewari et al. ............... 719/324 |
| 2005/0251639 A1 | 11/2005 | Vishin et al. |
| 2005/0251649 A1 | 11/2005 | Yamazaki |
| 2005/0262270 A1 | 11/2005 | Latorre et al. |
| 2005/0289299 A1 | 12/2005 | Nunamaker et al. |
| 2005/0289530 A1 | 12/2005 | Robison |
| 2006/0004964 A1 | 1/2006 | Conti et al. |
| 2006/0026381 A1 | 2/2006 | Doi et al. |
| 2006/0026408 A1 | 2/2006 | Morris et al. |
| 2006/0036516 A1 | 2/2006 | Glebe |

(56) References Cited

U.S. PATENT DOCUMENTS

| | | |
|---|---|---|
| 2006/0094446 A1 | 5/2006 | Duan |
| 2006/0095720 A1 | 5/2006 | Biles et al. |
| 2006/0143390 A1 | 6/2006 | Kottapalli |
| 2006/0161421 A1 | 7/2006 | Kissell |
| 2006/0161921 A1 | 7/2006 | Kissell |
| 2006/0179257 A1 | 8/2006 | Chu et al. |
| 2006/0179281 A1 | 8/2006 | Jensen et al. |
| 2006/0179289 A1 | 8/2006 | Floyd et al. |
| 2006/0190707 A1 | 8/2006 | McIlvaine et al. |
| 2006/0212687 A1 | 9/2006 | Chen et al. |
| 2006/0230243 A1 | 10/2006 | Cochran et al. |
| 2006/0230253 A1 | 10/2006 | Codrescu et al. |
| 2006/0230409 A1 | 10/2006 | Frigo et al. |
| 2006/0236074 A1 | 10/2006 | Williamson et al. |
| 2006/0242365 A1 | 10/2006 | Ali et al. |
| 2006/0242384 A1 | 10/2006 | Ahmed et al. |
| 2006/0277365 A1 | 12/2006 | Pong |
| 2006/0282839 A1 | 12/2006 | Hankins et al. |
| 2007/0006231 A1 | 1/2007 | Wang et al. |
| 2007/0074005 A1 | 3/2007 | Abernathy et al. |
| 2007/0198665 A1 | 8/2007 | De Matteis et al. |
| 2007/0214343 A1 | 9/2007 | Lindholm et al. |
| 2007/0262270 A1 | 11/2007 | Huang et al. |
| 2008/0016507 A1 | 1/2008 | Thomas et al. |
| 2008/0040724 A1 | 2/2008 | Kang et al. |
| 2008/0046666 A1 | 2/2008 | Termaine et al. |
| 2008/0052432 A1 | 2/2008 | Wilson et al. |
| 2008/0077813 A1 | 3/2008 | Keller et al. |
| 2008/0091880 A1 | 4/2008 | Vishin |
| 2008/0104598 A1 | 5/2008 | Chang |
| 2008/0109611 A1 | 5/2008 | Liu et al. |
| 2008/0126643 A1 | 5/2008 | Higuchi |
| 2008/0126771 A1 | 5/2008 | Chen et al. |
| 2008/0148237 A1 | 6/2008 | Jiang et al. |
| 2008/0184211 A1 | 7/2008 | Nickolls et al. |
| 2008/0195844 A1 | 8/2008 | Shen et al. |
| 2008/0215865 A1 | 9/2008 | Hino et al. |
| 2008/0225987 A1 | 9/2008 | Fazzi et al. |
| 2008/0235500 A1 | 9/2008 | Davis et al. |
| 2008/0250227 A1 | 10/2008 | Linderman et al. |
| 2008/0256278 A1 | 10/2008 | Thomas et al. |
| 2008/0256330 A1 | 10/2008 | Wang et al. |
| 2008/0270758 A1 | 10/2008 | Ozer et al. |
| 2008/0270774 A1 | 10/2008 | Singh et al. |
| 2008/0282037 A1 | 11/2008 | Kusachi et al. |
| 2008/0320476 A1 | 12/2008 | Wingard et al. |
| 2009/0019264 A1 | 1/2009 | Correale, Jr. et al. |
| 2009/0031104 A1 | 1/2009 | Vorbach et al. |
| 2009/0070554 A1 | 3/2009 | Wang et al. |
| 2009/0113170 A1 | 4/2009 | Abdallah |
| 2009/0119457 A1 | 5/2009 | Latorre et al. |
| 2009/0138659 A1 | 5/2009 | Lauterbach |
| 2009/0138670 A1 | 5/2009 | Mutlu et al. |
| 2009/0150647 A1* | 6/2009 | Mejdrich et al. ............. 712/3 |
| 2009/0150890 A1 | 6/2009 | Yourst |
| 2009/0157980 A1 | 6/2009 | Bruce |
| 2009/0158017 A1 | 6/2009 | Mutlu et al. |
| 2009/0164733 A1 | 6/2009 | Kim et al. |
| 2009/0164766 A1 | 6/2009 | Suggs et al. |
| 2009/0165007 A1 | 6/2009 | Aghajanyan |
| 2009/0172344 A1 | 7/2009 | Grochowski et al. |
| 2009/0240919 A1 | 9/2009 | Alexander et al. |
| 2009/0249026 A1 | 10/2009 | Smelyanskiy et al. |
| 2009/0251476 A1 | 10/2009 | Jiao et al. |
| 2009/0282101 A1 | 11/2009 | Lim et al. |
| 2009/0287912 A1 | 11/2009 | Sendag |
| 2009/0307450 A1 | 12/2009 | Lee |
| 2009/0328053 A1 | 12/2009 | Dice |
| 2010/0058033 A1 | 3/2010 | Abernathy et al. |
| 2010/0064121 A1 | 3/2010 | Alexander et al. |
| 2010/0082912 A1 | 4/2010 | Lesartre et al. |
| 2010/0088443 A1 | 4/2010 | Riocreux et al. |
| 2010/0100690 A1 | 4/2010 | Rajamani et al. |
| 2010/0100704 A1 | 4/2010 | Hill et al. |
| 2010/0100707 A1 | 4/2010 | Mejdrich et al. |
| 2010/0115167 A1 | 5/2010 | Tardieux et al. |
| 2010/0115244 A1 | 5/2010 | Jensen et al. |
| 2010/0138607 A1 | 6/2010 | Hughes et al. |
| 2010/0154042 A1 | 6/2010 | Miyamoto et al. |
| 2010/0161948 A1 | 6/2010 | Abdallah |
| 2010/0169578 A1 | 7/2010 | Nychka et al. |
| 2010/0169611 A1 | 7/2010 | Chou et al. |
| 2010/0205603 A1 | 8/2010 | Merten et al. |
| 2010/0211746 A1 | 8/2010 | Tsukishiro |
| 2010/0280996 A1 | 11/2010 | Gross, IV et al. |
| 2010/0286976 A1 | 11/2010 | Gao et al. |
| 2010/0299671 A1 | 11/2010 | Kinsey |
| 2010/0306503 A1 | 12/2010 | Henry et al. |
| 2010/0325394 A1 | 12/2010 | Golla et al. |
| 2011/0010521 A1 | 1/2011 | Wang et al. |
| 2011/0055479 A1 | 3/2011 | West et al. |
| 2011/0067016 A1 | 3/2011 | Mizrachi et al. |
| 2011/0082980 A1 | 4/2011 | Gschwind et al. |
| 2011/0082983 A1 | 4/2011 | Koktan |
| 2011/0093857 A1 | 4/2011 | Sydow et al. |
| 2011/0119660 A1* | 5/2011 | Tanaka .......................... 717/149 |
| 2011/0153955 A1 | 6/2011 | Herrenschmidt et al. |
| 2011/0225588 A1 | 9/2011 | Pollock et al. |
| 2012/0005462 A1 | 1/2012 | Hall et al. |
| 2012/0023318 A1 | 1/2012 | Xing et al. |
| 2012/0042105 A1 | 2/2012 | Maeda et al. |
| 2012/0042126 A1 | 2/2012 | Krick et al. |
| 2012/0066483 A1 | 3/2012 | Boury et al. |
| 2012/0089812 A1 | 4/2012 | Smith |
| 2012/0096204 A1 | 4/2012 | Auerbach et al. |
| 2012/0246450 A1 | 9/2012 | Abdallah |
| 2012/0246657 A1 | 9/2012 | Abdallah |
| 2012/0278593 A1 | 11/2012 | Clark et al. |
| 2013/0019047 A1 | 1/2013 | Podvalny et al. |
| 2013/0036296 A1 | 2/2013 | Hickey et al. |
| 2013/0046934 A1 | 2/2013 | Nychka et al. |
| 2013/0086417 A1 | 4/2013 | Sivaramakrishnan et al. |
| 2013/0097369 A1 | 4/2013 | Talagala et al. |
| 2013/0238874 A1 | 9/2013 | Avudaiyappan et al. |
| 2013/0283286 A1 | 10/2013 | Lee et al. |
| 2013/0304991 A1 | 11/2013 | Böottcher et al. |
| 2013/0311759 A1 | 11/2013 | Abdallah |
| 2013/0346699 A1 | 12/2013 | Walker |
| 2014/0032844 A1 | 1/2014 | Avudaiyappan et al. |
| 2014/0032845 A1 | 1/2014 | Avudaiyappan et al. |
| 2014/0032856 A1 | 1/2014 | Avudaiyappan |
| 2014/0075168 A1 | 3/2014 | Abdallah |
| 2014/0108730 A1 | 4/2014 | Avudaiyappan et al. |
| 2014/0123145 A1 | 5/2014 | Barrow-Williams et al. |
| 2014/0156947 A1 | 6/2014 | Avudaiyappan |
| 2014/0181833 A1 | 6/2014 | Bird et al. |
| 2014/0281242 A1 | 9/2014 | Abdallah et al. |
| 2014/0281411 A1 | 9/2014 | Abdallah |
| 2014/0281412 A1 | 9/2014 | Abdallah |
| 2014/0281416 A1 | 9/2014 | Abdallah |
| 2014/0281426 A1 | 9/2014 | Abdallah et al. |
| 2014/0281427 A1 | 9/2014 | Abdallah |
| 2014/0281428 A1 | 9/2014 | Abdallah et al. |
| 2014/0281436 A1 | 9/2014 | Abdallah |
| 2014/0282592 A1 | 9/2014 | Abdallah |
| 2014/0282601 A1 | 9/2014 | Abdallah |
| 2014/0317387 A1 | 10/2014 | Abdallah |
| 2014/0344554 A1 | 11/2014 | Abdallah |
| 2014/0373022 A1 | 12/2014 | Chan |
| 2015/0039859 A1 | 2/2015 | Abdallah |
| 2015/0046683 A1 | 2/2015 | Abdallah |
| 2015/0046686 A1 | 2/2015 | Abdallah |
| 2015/0186144 A1 | 7/2015 | Abdallah |
| 2016/0041908 A1 | 2/2016 | Avudaiyappan |
| 2016/0041913 A1 | 2/2016 | Avudaiyappan |
| 2016/0041930 A1 | 2/2016 | Avudaiyappan |
| 2016/0154653 A1 | 6/2016 | Abdallah |
| 2016/0210145 A1 | 7/2016 | Abdallah |

(56) References Cited

U.S. PATENT DOCUMENTS

| | | | |
|---|---|---|---|
| 2016/0210176 | A1 | 7/2016 | Abdallah |
| 2016/0371188 | A1 | 12/2016 | Abdallah et al. |

FOREIGN PATENT DOCUMENTS

| | | | |
|---|---|---|---|
| CN | 1305150 | A | 7/2001 |
| CN | 1451115 | A | 10/2003 |
| CN | 1214666 | C | 8/2005 |
| CN | 1713137 | A | 12/2005 |
| CN | 1774709 | A | 5/2006 |
| CN | 1841314 | A | 10/2006 |
| CN | 1881223 | A | 12/2006 |
| CN | 101114218 | A | 1/2008 |
| CN | 101241428 | A | 8/2008 |
| CN | 101344840 | A | 1/2009 |
| CN | 101449256 | | 6/2009 |
| CN | 101582025 | A | 11/2009 |
| CN | 101627365 | | 1/2010 |
| CN | 101916180 | A | 12/2010 |
| CN | 102105864 | | 6/2011 |
| EP | 0596636 | A2 | 5/1994 |
| EP | 0706133 | A2 | 4/1996 |
| EP | 2616928 | A2 | 7/2013 |
| GB | 2343270 | A | 5/2000 |
| KR | 20010050794 | A | 6/2001 |
| KR | 20010053622 | | 6/2001 |
| KR | 20100003309 | A | 1/2010 |
| TW | 200707284 | | 3/1995 |
| TW | 539996 | B | 7/2003 |
| TW | 544626 | B | 8/2003 |
| TW | 200401187 | A | 1/2004 |
| TW | 591530 | B | 6/2004 |
| TW | 200422949 | A | 11/2004 |
| TW | 1233545 | B | 6/2005 |
| TW | 1281121 | B | 5/2007 |
| TW | 200813766 | A | 3/2008 |
| TW | 200844853 | | 11/2008 |
| TW | 1315488 | B | 10/2009 |
| TW | 200941339 | | 10/2009 |
| TW | 200949690 | A | 12/2009 |
| TW | 1329437 | B | 8/2010 |
| TW | 1331282 | B | 10/2010 |
| TW | 1352288 | B | 11/2011 |
| TW | 201227520 | A | 7/2012 |
| TW | 201241744 | A | 10/2012 |
| TW | 201305819 | A | 2/2013 |
| WO | 9750031 | A1 | 12/1997 |
| WO | 9919793 | A1 | 4/1999 |
| WO | 0125921 | A1 | 4/2001 |
| WO | 2004114128 | A2 | 12/2004 |
| WO | 2008021434 | A1 | 2/2008 |
| WO | 2008061154 | | 5/2008 |
| WO | 2009012296 | | 1/2009 |
| WO | 2009101563 | | 8/2009 |
| WO | 2010049585 | A1 | 5/2010 |
| WO | WO2012135031 | | 10/2012 |
| WO | WO2012135050 | | 10/2012 |

OTHER PUBLICATIONS

Final Office Action from U.S. Appl. No. 14/212,533, dated Jan. 4, 2017, 27 pages.
Final Office Action from U.S. Appl. No. 14/213,115, dated Feb. 3, 2015, 11 pages.
Final Office Action from U.S. Appl. No. 14/213,115, dated Mar. 7, 2016, 18 pages.
Final Office Action from U.S. Appl. No. 14/213,692, dated Jan. 20, 2016, 18 pages.
Final Office Action from U.S. Appl. No. 14/213,854, dated Nov. 9, 2015, 19 pages.
Final Office Action from U.S. Appl. No. 14/214,045, dated Aug. 29, 2016, 14 pages.
Final Office Action from U.S. Appl. No. 14/214,280, dated Mar. 6, 2017, 12 pages.
Final Office Action from U.S. Appl. No. 14/214,280, dated Mar. 11, 2016, 18 pages.
Final Office Action from U.S. Appl. No. 14/214,280, dated Oct. 24, 2016, 20 pages.
Final Office Action from U.S. Appl. No. 14/360,284, mailed Mar. 1, 2017, 10 pages.
First Office Action from foreign counterpart China Patent Application No. CN201280034725, dated Oct. 26, 2015, 26 pages.
First Office Action from foreign counterpart China Patent Application No. CN201280034739, dated Nov. 3, 2015, 39 pages.
First Office Action from foreign counterpart China Patent Application No. CN201310589048, dated Feb. 2, 2016, 8 pages.
First Office Action from foreign counterpart Chinese Patent Application No. 201280024054.0, dated May 30, 2016, 24 pages.
First Office Action from foreign counterpart Chinese patent application No. 201280024095, dated May 26, 2016, 32 pages.
Franklin et al., "The Expandable Split Window Paradigm for Exploiting Fine-Grain Parallelism," ACM Sigarch Computer Architecture News, ACM Special Interest Group on Computer Architecture, vol. 20 (2), 1992, 10 pages.
Grant of Patent for Korean Application No. 10-2015-7028745, dated Nov. 30, 2016, 2 pages.
Intention to Grant a patent for European Application No. 07811845, dated Mar. 31, 2016, 58 pages.
Intention to Grant a patent for European Application No. 12150513, dated Mar. 15, 2016, 59 pages.
International Preliminary Report on Patentability and for Application No. PCT/US2007/084710, dated May 19, 2009, 4 pages.
International Preliminary Report on Patentability and Written Opinion for Application No. PCT/US2007/066536, dated Oct. 14, 2008, 6 pages.
International Preliminary Report on Patentability and Written Opinion for Application No. PCT/US2012/038711, dated Nov. 20, 2013, 5 pages.
International Preliminary Report on Patentability and Written Opinion for Application No. PCT/US2012/038713, dated Nov. 20, 2013, 5 pages.
International Preliminary Report on Patentability for Application No. PCT/US2011/051992, dated Mar. 28, 2013, 8 pages.
International Preliminary Report on Patentability for Application No. PCT/US2011/061953, dated Jun. 5, 2014, 7 pages.
International Preliminary Report on Patentability for Application No. PCT/US2012/030383, dated Oct. 10, 2013, 6 pages.
International Preliminary Report on Patentability for Application No. PCT/US2012/030409, dated Oct. 10, 2013, 6 pages.
International Preliminary Report on Patentability for Application No. PCT/US2012/30360, dated Oct. 10, 2013, 6 pages.
International Preliminary Report on Patentability for Application No. PCT/US2014/024276, dated Sep. 24, 2015, 6 pages.
International Preliminary Report on Patentability for Application No. PCT/US2014/024608, dated Sep. 24, 2015, 8 pages.
International Preliminary Report on Patentability for Application No. PCT/US2014/024722, dated Sep. 24, 2015, 6 pages.
International Preliminary Report on Patentability for Application No. PCT/US2014/024775, dated Sep. 24, 2015, 6 pages.
International Search Report and Written Opinion for Application No. PCT/US2007/084710, dated May 22, 2008, 6 pages.
International Search Report and Written Opinion for Application No. PCT/US2011/051992, dated Mar. 28, 2012, 11 pages.
International Search Report and Written Opinion for Application No. PCT/US2011/061953, dated Jul. 24, 2012, 8 pages.
International Search Report and Written Opinion for Application No. PCT/US2012/030383, dated Oct. 25, 2012, 8 pages.
International Search Report and Written Opinion for Application No. PCT/US2012/030409, dated Oct. 12, 2012, 7 pages.
International Search Report and Written opinion for Application No. PCT/US2012/038711, dated Nov. 28, 2012, 7 pages.
International Search Report and Written Opinion for Application No. PCT/US2012/038713, dated Oct. 29, 2012, 7 pages.
International Search Report and Written Opinion for Application No. PCT/US2012/30360, dated Oct. 29, 2012, 7 pages.

(56) References Cited

OTHER PUBLICATIONS

International Search Report and Written Opinion for Application No. PCT/US2014/024276, dated Jul. 31, 2014, 7 pages.
International Search Report and Written Opinion for Application No. PCT/US2014/024608, dated Jul. 31, 2014, 9 pages.
International Search Report and Written Opinion for Application No. PCT/US2014/024722, dated Jun. 27, 2014, 7 pages.
International Search Report and Written Opinion for Application No. PCT/US2014/024775, dated Jun. 2, 2014, 7 pages.
International Search Report for Application No. PCT/US2007/066536, dated Jul. 30, 2008, 2 pages.
Kozyrakis et al., "A New Direction for Computer Architecture Research," IEEE, Nov. 1, 1998, vol. 31 (11), pp. 24-32.
Mogul J.C., et al., "Potential Benefits of Delta Encoding and Data Compression for HTTP," Oct. 1, 1997, ACM, SIGCOMM '97, pp. 181-194.
Nagarajan et al., "A Design Space Evaluation of Grid Processor Architectures," 34th ACM/IEEE International Symposium, Piscataway, NJ, Dec. 1-5, 2001, pp. 40-51.
Nanda A.K., et al., "The Misprediction Recovery Cache," International Journal of Parallel Programming, Plenum Publishing Corporation, 1998, vol. 26 (4), pp. 383-415.
Non-Final Office Action from U.S. Appl. No. 12/296,919, dated Apr. 37, 2011, 8 pages.
Non-Final Office Action from U.S. Appl. No. 12/296,919, dated Jun. 14, 2010, 7 pages.
Non-Final Office Action from U.S. Appl. No. 12/296,919, dated Mar. 37, 2012, 7 pages.
Non-Final Office Action from U.S. Appl. No. 12/514,303, dated Jun. 27, 2013, 7 pages.
Non-Final Office Action from U.S. Appl. No. 12/514,303, dated May 10, 2012, 9 pages.
Non-Final Office Action from U.S. Appl. No. 13/428,440, dated Jun. 18, 2014, 16 pages.
Non-Final Office Action from U.S. Appl. No. 13/428,440, dated May 4, 2015, 13 pages.
Non-Final Office Action from U.S. Appl. No. 13/428,452, dated Apr. 23, 2015, 11 pages.
Non-Final Office Action from U.S. Appl. No. 13/428,452, dated Apr. 28, 2014, 21 pages.
Non-Final Office Action from U.S. Appl. No. 13/475,708, dated Feb. 11, 2015, 27 pages.
Non-Final Office Action from U.S. Appl. No. 13/475,708, dated Feb. 12, 2016, 37 pages.
Non-Final Office Action from U.S. Appl. No. 13/475,739, dated May 21, 2015, 14 pages.
Non-Final Office Action from U.S. Appl. No. 13/475,739, dated Sep. 32, 2014, 15 pages.
Non-Final Office Action from U.S. Appl. No. 13/691,609, dated Jan. 15, 2014, 5 pages.
Non-Final Office Action from U.S. Appl. No. 13/691,609, dated Sep. 5, 2013, 11 pages.
Non-Final Office Action from U.S. Appl. No. 14/194,589, dated Nov. 19, 2015, 12 pages.
Non-Final Office Action from U.S. Appl. No. 14/212,203, dated Mar. 24, 2017, 68 pages.
Non-Final Office Action from U.S. Appl. No. 14/212,203, dated Sep. 38, 2016, 52 pages.
Non-Final Office Action from U.S. Appl. No. 14/212,533, dated Sep. 22, 2016, 52 pages.
Non-Final Office Action from U.S. Appl. No. 14/213,115, dated Oct. 19, 2015, 24 pages.
Non-Final Office Action from U.S. Appl. No. 14/213,115, dated Sep. 22, 2014, 19 pages.
Non-final Office Action from U.S. Appl. No. 14/213,692, dated Aug. 24, 2015, 30 pages.
Non-final Office Action from U.S. Appl. No. 14/213,692, dated Jun. 13, 2016, 17 pages.
Non-Final Office Action from U.S. Appl. No. 14/213,854, dated Apr. 29, 2016, 13 pages.
Non-Final Office Action from U.S. Appl. No. 14/213,854, dated Jun. 19, 2015, 23 pages.
Non-Final Office Action from U.S. Appl. No. 14/214,045, dated Apr. 1, 2016, 61 pages.
Non-Final Office Action from U.S. Appl. No. 14/214,045, dated Dec. 19, 2016, 88 pages.
Non-Final Office Action from U.S. Appl. No. 14/214,280, dated Jan. 36, 2017, 14 pages.
Non-Final Office Action from U.S. Appl. No. 14/214,280, dated Jun. 16, 2016, 12 pages.
Non-Final Office Action from U.S. Appl. No. 14/214,280, dated Sep. 18, 2015, 18 pages.
Non-final Office Action from U.S. Appl. No. 14/360,284, dated Oct. 21, 2016, 32 pages.
Notice of Allowance from foreign counterpart Chinese Patent Application No. 200780046679, dated Feb. 6, 2017, 8 pages.
Notice of Allowance from foreign counterpart Korean Patent Application No. 20137027841, dated Mar. 31, 2016, 2 pages.
Notice of Allowance from U.S. Appl. No. 12/296,919, dated Jul. 27, 2012, 6 pages.
Notice of Allowance from U.S. Appl. No. 12/514,303, dated Oct. 25, 2013, 12 pages.
Notice of Allowance from U.S. Appl. No. 13/428,440, dated Feb. 26, 2016, 10 pages.
Notice of Allowance from U.S. Appl. No. 13/428,440, dated Mar. 10, 2017, 52 pages.
Notice of Allowance from U.S. Appl. No. 13/428,440, dated Nov. 16, 2016, 9 pages.
Notice of Allowance from U.S. Appl. No. 13/428,440, dated Nov. 20, 2015, 9 pages.
Notice of Allowance from U.S. Appl. No. 13/428,452, dated Oct. 21, 2015, 9 pages.
Notice of Allowance from U.S. Appl. No. 13/475,708, dated Mar. 17, 2017, 55 pages.
Notice of Allowance from U.S. Appl. No. 13/475,708, dated Oct. 13, 2016, 17 pages.
Notice of Allowance from U.S. Appl. No. 13/475,739, dated Aug. 3, 2016, 11 pages.
Notice of Allowance from U.S. Appl. No. 13/475,739, dated Mar. 25, 2016, 25 pages.
Notice of Allowance from U.S. Appl. No. 13/691,609, dated Aug. 36, 2014, 11 pages.
Notice of Allowance from U.S. Appl. No. 13/691,609, dated Feb. 23, 2015, 16 pages.
Notice of Allowance from U.S. Appl. No. 14/194,589, dated Jul. 27, 2016, 7 pages.
Notice of Allowance from U.S. Appl. No. 14/213,115, dated Jun. 27, 2016, 9 pages.
Notice of Allowance from U.S. Appl. No. 14/213,115, dated Oct. 3, 2016, 20 pages.
Notice of Allowance from U.S. Appl. No. 14/213,692, dated Dec. 23, 2016, 19 pages.
Notice of Allowance from U.S. Appl. No. 14/213,854, dated Oct. 7, 2016, 19 pages.
Notification of Reason for Refusal from Foreign Counterpart Korean Patent Application No. 10-2013-7027842, dated Sep. 18, 2015, 7 pages.
Notification of Reason for Refusal from foreign counterpart Korean Patent Application No. 20137027841, dated Sep. 18, 2015, 10 pages.
Notification of Reason for Refusal from foreign counterpart Korean Patent Application No. 20137033565, dated Sep. 30, 2015, 6 pages.
Notification of Reason for Refusal from foreign counterpart Korean Patent Application No. 20137033566, dated Sep. 30, 2015, 9 pages.
Notification of Reason for Refusal from foreign counterpart Korean Patent Application No. KR1020137027843, dated Sep. 30, 2015, 8 pages.
Notification of Reason for Refusal from Korean Application No. 10-2015-7028745, dated May 23, 2016, 8 pages.
Notification to Grant Patent Right for Invention from foreign counterpart China Patent Application No. CN201280034725, dated Aug. 12, 2016, 3 pages.

(56) References Cited

OTHER PUBLICATIONS

Notification to Grant Patent Right for Invention from foreign counterpart China Patent Application No. CN201310589048, dated May 5, 2016, 3 pages.
Nuth et al., "The Named-State Register File: Implementation and Performance," High-Performance Computer Architecture, First IEEE Symposium, 1995, 10 pages.
Office Action from foreign counterpart Chinese Patent Application No. 200780046679, dated May 21, 2013, 14 pages.
Office Action from foreign counterpart Chinese patent application No. 201280024012, dated Feb. 3, 2017, 20 pages.
Office Action from foreign counterpart Chinese patent application No. 201280024095, dated Feb. 4, 2017, 31 pages.
Office Action from foreign counterpart European Patent Application No. EP12764838, dated Oct. 4, 2016, 4 pages.
Office Action from foreign counterpart Taiwan Patent Application No. 20140109479, dated Nov. 28, 2016, 4 pages.
Partial SupplementaryEuropean Search Report for Application No. 14769450.9, dated Oct. 11, 2016, 8 pages.
Restriction Requirement from U.S. Appl. No. 12/296,919, dated Feb. 8, 2011, 4 pages.
Restriction Requirement from U.S. Appl. No. 12/514,303, dated Oct. 15, 2012, 4 pages.
Santos et al., "The 2D-VLIW Architecture," Mar. 2006, 13 pages.
Sassone et al., "Dynamic Strands: Collapsing Speculative Dependence Chains for Reducing Pipeline Communication," Microarchitecture, IEEE, 37th International Symposium on Portland, USA Dec. 2004, Piscataway, NJ, USA.
Search Report for Chinese Application No. CN201280024012, dated May 19, 2016, 2 pages.
Second Office Action from foreign counterpart China Patent Application No. CN201280034725, dated Apr. 14, 2016, 8 pages.
Second Office Action from foreign counterpart China Patent Application No. CN201280034739, dated Jun. 23, 2016, 44 pages.
Second Office Action from foreign counterpart Chinese Patent Application No. 201280024054.0, dated Dec. 26, 2016, 11 pages.
Second Office Action with search report from foreign counterpart Chinese Patent Application No. 201180076244, dated Nov. 18, 2016, 21 pages. (Translation available only for Office Action).
Shiliang Hu., et al., "An Approach for Implementing Efficient Superscalar CISC Processors," High Performance computer Architecture, 2006, Twelfth International Symposium on Austin, Texas Feb. 11-15, 2006, pp. 40-51.
Summons to attend Oral Proceedings for European Application No. 070864410, dated Apr. 3, 2013, 3 pages.
Third Office Action from foreign counterpart Chinese Patent Application No. 201280034739, dated Dec. 27, 2016, 18 pages.
Wallace S., et al.,"Multiple Branch and Block Prediction," Third International symposium on High-Performance computer Architecture, IEEE, Feb. 1997, pp. 94-103.
Written Opinion for Application No. PCT/US2007/066536, dated Jul. 30, 2008, 5 pages.
Ye J., et al.,"A New Recovery Mechanism in Superscalar Microprocessors by Recovering Critical Misprediction,"IEICE Transactions on Fundamentals of Electronics, Communications and Computer Sciences, 2011, vol. E94-A (12), pp. 2639-2648.
Yeh T., et al.,"Increasing the Instruction Fetch Rate Via Multiple Branch Prediction and a Branch Address Cache," 7th International Conference on Supercomputing, ACM, 1993, pp. 67-76.
Final Office Action from U.S. Appl. No. 14/213,218, dated Jul. 6, 2016, 24 pages.
Final Office Action from U.S. Appl. No. 14/213,218, dated Jul. 22, 2015, 16 pages.
Final Office Action from U.S. Appl. No. 14/214,176, dated Aug. 29, 2016, 17 pages.
Non-Final Office Action from U.S. Appl. No. 14/213,218, dated Apr. 22, 2015, 22 pages.
Non-Final Office Action from U.S. Appl. No. 14/213,218, dated Feb. 2, 2016, 17 pages.

Non-Final Office Action from U.S. Appl. No. 14/214,176, dated Jan. 6, 2017, 36 pages.
Non-Final Office Action from U.S. Appl. No. 14/214,176, dated Mar. 25, 2016, 25 pages.
Abandonment from U.S. Appl. No. 13/824,013, dated Mar. 3, 2015, 1 page.
Advisory Action from U.S. Appl. No. 12/296,919, dated Aug. 26, 2011, 3 pages.
Alimohammad et al., "Modeling of FPGA Local/global Interconnect Resources and Derivation of Minimal Test Configuration," 2002, IEEE, Proceedings of the 17th IEEE International Symposium on Defect and Fault Tolerance in VLSI Systems, DFT'02, pp. 1-9.
Communication pursuant to Article 94(3) EPC for European Application No. 070864410, dated Mar. 16, 2012, 4 pages.
Communication pursuant to Article 94(3) EPC for European Application No. 070864410, dated Nov. 14, 2012, 4 pages.
Communication pursuant to Article 94(3) EPC for European Application No. 07811845, dated Apr. 16, 2014, 5 pages.
Communication pursuant to Article 94(3) EPC for European Application No. 07811845, dated Dec. 21, 2015, 3 pages.
Communication pursuant to Article 94(3) EPC for European Application No. 07811845, dated Feb. 3, 2014, 5 pages.
Communication pursuant to Article 94(3) EPC for European Application No. 07811845, dated Feb. 16, 2011, 6 pages.
Communication pursuant to Article 94(3) EPC for European Application No. 07811845, dated Jan. 27, 2012, 7 pages.
Communication pursuant to Article 94(3) EPC for European Application No. 12150513, dated Apr. 16, 2013, 5 pages.
Communication pursuant to Article 94(3) EPC for European Application No. 12150513, dated Dec. 21, 2015, 4 pages.
Communication pursuant to Article 94(3) EPC for European Application No. 12150513, dated May 9, 2014, 8 pages.
Communication pursuant to Article 94(3) EPC for European Application No. 12174228, dated Jun. 11, 2013, 3 pages.
Communication pursuant to Article 94(3) EPC for European Application No. 12764627, dated Oct. 4, 2016, 4 pages.
Communication pursuant to Rules 161(2) and 162 EPC for Application No. 12763717, dated Nov. 22, 2013, 3 pages.
Communication pursuant to Rules 70(2) and 70a(2) EPC for Application No. 12763717, dated Oct. 10, 2014, 1 page.
Decision to Grant a Patent for European Application No. 07811845, dated Jun. 16, 2016, 2 pages.
Decision to Grant a Patent for European Application No. 12150513, dated Jun. 16, 2016, 2 pages.
Decision to Grant a Patent for European Application No. 12174228, dated Dec. 13, 2013, 5 pages.
Decision to Grant a Patent for Korean Application No. KR1020137027843, dated Apr. 29, 2016, 2 pages.
Decision to Grant a Patent for Korean Patent Application No. 20137027842, dated Mar. 31, 2016, 2 pages.
Decision to Grant a Patent from foreign counterpart Korean Patent Application No. 20137033565, dated Apr. 29, 2016, 2 pages.
Decision to Grant a Patent from foreign counterpart Korean Patent Application No. 20137033566, dated Apr. 29, 2016, 2 pages.
Examination Report for European Application No. 12763717, dated Nov. 28, 2016, 5 pages.
Extended European Search Report for Application No. 07811845.2, dated Nov. 2, 2009, 7 pages.
Extended European Search Report for Application No. 07864410, dated Feb. 19, 2010, 8 pages.
Extended European Search Report for Application No. 12150513, dated Jun. 19, 2012, 8 pages.
Extended European Search Report for Application No. 12174228, dated Oct. 16, 2012, 4 pages.
Extended European Search Report for Application No. 12174229, dated Jul. 4, 2014, 10 pages.
Extended European Search Report for Application No. 12174229, dated Oct. 10, 2012, 7 pages.
Extended European Search Report for Application No. 12788989, dated May 12, 2016, 9 pages.
Extended European Search Report for Application No. 12789667, dated Feb. 26, 2016, 7 pages.

(56) References Cited

OTHER PUBLICATIONS

Extended European Search Report for Application No. 14769450.9, dated Feb. 21, 2017, 16 pages.
Extended European Search Report for Application No. EP110826042, dated Jan. 24, 2014, 6 pages.
Extended European Search Report for Application No. EP11876128, dated Jun. 21, 2016, 8 pages.
Extended European Search Report for Application No. EP12763717, dated Sep. 24, 2014, 5 pages.
Extended European Search Report for Application No. EP12764627, dated Jul. 10, 2014, 5 pages.
Extended European Search Report for Application No. EP12764838, dated Jul. 10, 2014, 5 pages.
Final Office Action from U.S. Appl. No. 121296,919, dated Jun. 14, 2011, 7 pages.
Final Office Action from U.S. Appl. No. 12/296,919, dated Oct. 22, 2010, 7 pages.
Final Office Action from U.S. Appl. No. 12/514,303, dated Jan. 24, 2013, 11 pages.
Final Office Action from U.S. Appl. No. 13/428,440, dated Dec. 24, 2014, 19 pages.
Final Office Action from U.S. Appl. No. 13/428,452, dated Dec. 24, 2014, 20 pages.
Final Office Action from U.S. Appl. No. 13/475,708, dated Jun. 9, 2016, 35 pages.
Final Office Action from U.S. Appl. No. 13/475,708, dated May 8, 2015, 23 pages.
Final Office Action from U.S. Appl. No. 13/475,739, dated Feb. 4, 2015, 12 pages.
Final Office Action from U.S. Appl. No. 13/475,739, dated Nov. 23, 2015, 28 pages.
Final Office Action from U.S. Appl. No. 14/194,589, dated Apr. 19, 2016, 7 pages.
Final Office Action from U.S. Appl. No. 14/212,203, dated Dec. 13, 2016, 20 pages.
Advisory Action from U.S. Appl. No. 14/214,280, dated May 15, 2017, 3 pages.
Decision to grant a patent from foreign counterpart Korean Patent Application No. 10-2014-7016774, dated Jul. 25, 2016, 2 pages.
Decision to Grant a Patent from foreign counterpart Korean Patent Application No. KR1020157029107, dated Apr. 25, 2017, 2 pages.
Extended European Search Report for Application No. 14769411.1, dated Apr. 5, 2017, 8 pages.
Extended European Search Report for Application No. 14770976.0, dated Jul. 3, 2017, 9 pages.
Extended European Search Report for Application No. 16196777.3, dated Mar. 20, 2017, 6 pages.
Extended European Search Report for Application No. EP11876130, dated Jun. 1, 2016, 7 pages.
Final Office Action from U.S. Appl. No. 14/213,135, dated Oct. 26, 2015, 20 pages.
Final Office Action from U.S. Appl. No. 14/213,730, dated May 11, 2016, 14 pages.
Final Office Action from U.S. Appl. No. 14/216,493, dated May 22, 2017, 17 pages.
Final Office Action from U.S. Appl. No. 14/216,859, dated Jun. 9, 2016, 16 pages.
First Office Action and Search Report from foreign counterpart China Patent Application No. 201480024463.X, dated Apr. 1, 2017, 31 pages. (Translation available only for office action).
First Office Action and Search report from foreign counterpart Chinese Patent Application No. 201180076244.2, dated Mar. 22, 2016, 18 pages. (Translation available only for Office Action).
First Office Action from foreign counterpart China Patent Application No. 201180076245.7, dated Mar. 21, 2016, 10 pages.
First Office Action from foreign counterpart China Patent Application No. 201280024012.7, dated May 30, 2016, 21 pages.
International Preliminary Report on Patentability for Application No. PCT/US2011/061940, dated Jun. 5, 2014, 6 pages.
International Preliminary Report on Patentability for Application No. PCT/US2014/024677, dated Sep. 24, 2015, 7 pages.
International Preliminary Report on Patentability for Application No. PCT/US2014/024828, dated Sep. 24, 2015, 8 pages.
International Search Report and Written Opinion for Application No. PCT/US2011/061940, dated Jul. 20, 2012, 8 pages.
International Search Report and Written Opinion for Application No. PCT/US2014/024677, dated Jun. 30, 2014, 9 pages.
International Search Report and Written Opinion for Application No. PCT/US2014/024828, dated Jul. 28, 2014, 9 pages.
Non-Final Office Action from U.S. Appl. No. 14/212,533, dated Apr. 20, 2017, 116 pages.
Non-Final Office Action from U.S. Appl. No. 14/213,135, dated May 14, 2015, 23 pages.
Non-Final Office Action from U.S. Appl. No. 14/213,135, dated May 31, 2016, 14 pages.
Non-Final Office Action from U.S. Appl. No. 14/213,730, dated Jan. 37, 2016, 27 pages.
Non-Final Office Action from U.S. Appl. No. 14/216,859, dated Jan. 28, 2016, 33 pages.
Non-Final Office Action from U.S. Appl. No. 14/360,280, dated Feb. 23, 2017, 34 pages.
Non-Final Office Action from U.S. Appl. No. 14/360,282, dated Jun. 22, 2017, 97 pages.
Non-Final Office Action from U.S. Appl. No. 14/733,827, dated Apr. 28, 2017, 99 pages.
Non-Final Office Action from U.S. Appl. No. 15/219,063, dated May 30, 2017, 102 pages.
Notice of Allowance from U.S. Appl. No. 13/428,440, dated Apr. 20, 2017, 46 pages.
Notice of Allowance from U.S. Appl. No. 13/475,708, dated Jun. 16, 2017, 51 pages.
Notice of Allowance from U.S. Appl. No. 13/475,708, dated Jun. 30, 2017, 53 pages.
Notice of Allowance from U.S. Appl. No. 14/213,135, dated Oct. 17, 2016, 17 pages.
Notice of Allowance from U.S. Appl. No. 14/213,218, dated Jun. 16, 2017, 89 pages.
Notice of Allowance from U.S. Appl. No. 14/213,730, dated Oct. 27, 2016, 16 pages.
Notice of Allowance from U.S. Appl. No. 14/214,045, dated Apr. 18, 2017, 88 pages.
Notice of Allowance from U.S. Appl. No. 14/214,176, dated May 10, 2017, 88 pages.
Notice of Allowance from U.S. Appl. No. 14/214,280, dated Jun. 29, 2017, 86 pages.
Notice of Allowance from U.S. Appl. No. 14/215,633, dated Jun. 30, 2017, 83 pages.
Notice of Allowance from U.S. Appl. No. 14/216,859, dated Jan. 24, 2017, 17 pages.
Notice of Allowance from U.S. Appl. No. 14/360,284, dated Jun. 14, 2017, 100 pages.
Notice of Allowance from U.S. Appl. No. 15/082,867, dated Jul. 7, 2017, 98 pages.
Notice of Final Rejection from foreign counterpart Korean Patent Application No. 10-2015-7029262, dated May 23, 2017, 7 pages.
Notice of Preliminary Rejection from foreign counterpart Korean Patent Application No. 10-2016-7017150, dated Apr. 20, 2017, 5 pages.
Notification of Reason for Refusal from foreign counterpart Korean Patent Application No. 10-2014-7016774, dated Jan. 28, 2016, 4 pages.
Notification of Reason for Refusal from foreign counterpart Korean Patent Application No. 10-2015-7029262, dated Oct. 17, 2016, 12 pages.
Notification of Reason for Refusal from foreign counterpart Korean Patent Application No. 10-2017-7002473, dated May 26, 2017, 7 pages.
Notification of Reason for Refusal from foreign counterpart Korean Patent Application No. KR1020157029107, dated Oct. 13, 2016, 11 pages.

(56) References Cited

OTHER PUBLICATIONS

Notification to Grant Patent Right for Invention from foreign counterpart China Patent Application No. 201180076245.7, dated Nov. 2, 2016, 3 pages.
Office Action and Search Report from foreign counterpart Taiwan Patent Application No. 101117854, dated Mar. 30, 2017, 7 pages.
Partial Supplementary European Search Report for Application No. EP14770976.0, dated Mar. 24, 2017, 7 pages.
Third Office Action and Search report from foreign counterpart China Patent Application No. 201180076248.0, dated May 2, 2017, 27 pages.
Third Office Action from foreign counterpart Chinese Patent Application No. 201180076244.2, dated May 2, 2017, 20 pages.
Barham P., et al., "Xen and the Art of Virtualization," Proceedings of the ACM Symposium on Operating Systems Principles, XP002298786, Oct. 2003, pp. 164-177.
Communication pursuant to Rules 70(2) and 70a(2) EPC for European Application No. 11876314.3, dated Jul. 1, 2016, 1 page.
Cooperman G.,"Cache Basics," 2003, pp. 1-3, URL: http://www.ccs.neu.edu/course/com3200/parent/Notes/cache-basics.html.
Extended European Search Report for Application No. 11876314.3, dated Jun. 14, 2016, 6 pages.
Final Office Action from U.S. Appl. No. 14/216,493, dated Aug. 30, 2016, 21 pages.
Final Office Action from U.S. Appl. No. 14/360,282, dated Feb. 16, 2017, 10 pages.
First Office Action and Search report from foreign counterpart China Patent Application No. 201180076248.0, dated Mar. 17, 2016, 25 pages.
Garmany J., "The Power of Indexing," archieved on Mar. 9, 2009, 7 pages.
Grant of Patent for Korean Application No. 10-2014-7016763, dated Oct. 31, 2016, 2 pages.
International Preliminary Report on Patentability for Application No. PCT/US2011/061957, dated Jun. 5, 2014, 7 pages.
International Search Report and Written Opinion for Application No. PCT/US2011/061957, dated Jul. 20, 2012, 8 pages.
Jacobson et al., "Path-based Next Trace Prediction," IEEE, 1997, pp. 14-23.
Non-Final Office Action from U.S. Appl. No. 14/215,633, dated Oct. 22, 2015, 18 pages.
Non-final Office Action from U.S. Appl. No. 14/216,493, dated Apr. 4, 2016, 26 pages.
Non-Final Office Action from U.S. Appl. No. 14/216,493, dated Mar. 29, 2017, 18 pages.
Non-Final Office Action from U.S. Appl. No. 14/360,282, dated Oct. 21, 2016, 13 pages.
Non-final Office Action from U.S. Appl. No. 15/257,593, dated Apr. 7, 2017, 37 pages.
Notice of Allowance from U.S. Appl. No. 14/215,633, dated Mar. 23, 2017, 17 pages.
Notice of Allowance from U.S. Appl. No. 14/215,633, dated May 23, 2016, 3 pages.
Notice of Allowance from U.S. Appl. No. 14/215,633, dated Sep. 29, 2016, 13 pages.
Notification of Reason for Refusal from Korean Application No. 10-2014-7016763, dated Apr. 29, 2016, 11 pages.
Restriction Requirement from U.S. Appl. No. 14/360,282, dated Jul. 28, 2016, 4 pages.
Rotenberg E., et al.,"Trace Cache: a Low Latency Approach to High Bandwidth Instruction Fetching," Apr. 11, 1996, 48 pages.
Second Office Action from foreign counterpart China Patent Application No. 201180076248.0, dated Oct. 20, 2016, 25 pages.
Intel "Programming on Intel® Platform," The edition team of Intel® Software College course book, Shanghai Jiao Tong University Press, published Jan. 31, 2011, pp. 175-180.
Communication pursuant to Article 94(3) EPC for European Application No. 12788989.7, dated Jun. 22, 2017, 6 pages.
Final Office Action from U.S. Appl. No. 14/360,280, dated Aug. 10, 2017, 103 pages.
Notification of Reason for Refusal from foreign counterpart Korean Patent Application No. 10-2017-7002379, dated May 26, 2017, 6 pages.
Non-Final Office Action from U.S. Appl. No. 15/082,359, dated Aug. 11, 2017, 108 pages.
Notice of Allowance from U.S. Appl. No. 14/213,135, dated Aug. 3, 2017, 103 pages.
Notice of Allowance from U.S. Appl. No. 14/216,493, dated Aug. 4, 2017, 95 pages.
Notice of Allowance from U.S. Appl. No. 15/019,920, dated Jul. 14, 2017, 100 pages.
Final Office Action from U.S. Appl. No. 14/212,203, dated Sep. 12, 2017, 84 pages.
Final Office Action from U.S. Appl. No. 14/212,533, dated Sep. 8, 2017, 69 pages.
Final Office Action from U.S. Appl. No. 14/360,282, dated Oct. 4, 2017, 22 pages.
Non-final Office Action from U.S. Appl. No. 15/354,742, dated Aug. 25, 2017, 152 pages.
Non-Final Office Action from U.S. Appl. No. 15/354,857, dated Sep. 12, 2017, 111 pages.
Non-final Office Action from U.S. Appl. No. 15/357,943, dated Aug. 25, 2017, 111 pages.
Notice of Allowance from foreign counterpart Korean Patent Application No. 10-2015-7029262, dated Aug. 31, 2017, 3 pages.
Notice of Allowance from U.S. Appl. No. 14/213,692, dated Sep. 28, 2017, 112 pages.
Notice of Allowance from U.S. Appl. No. 14/213,730, dated Aug. 31, 2017, 96 pages.
Notice of Allowance from U.S. Appl. No. 14/214,045, dated Oct. 6, 2017, 137 pages.
Notice of Allowance from U.S. Appl. No. 14/214,176, dated Oct. 19, 2017, 25 pages.
Notice of Allowance from U.S. Appl. No. 14/215,633, dated Oct. 4, 2017, 15 pages.
Notice of Allowance from U.S. Appl. No. 14/733,827, dated Sep. 22, 2017, 30 pages.
Notice of Allowance from U.S. Appl. No. 15/257,593, dated Oct. 11, 2017, 95 pages.
Notice on Grant of Patent Right for Invention from foreign counterpart China Application No. 201180076244.2, dated Aug. 28, 2017, 4 pages.
Third Office Action from foreign counterpart China Patent Application No. 201280024054.0, dated Jul. 28, 2017, 8 pages.

* cited by examiner

REGISTER FILE SEGMENTS FOR SUPPORTING CODE BLOCK EXECUTION BY USING VIRTUAL CORES INSTANTIATED BY PARTITIONABLE ENGINES

This application claims the benefit co-pending commonly assigned U.S. Provisional Patent Application Ser. No. 61/467,939, titled "REGISTER FILE SEGMENTS FOR SUPPORTING CODE BLOCK EXECUTION BY USING VIRTUAL CORES INSTANTIATED BY PARTITIONABLE ENGINES" by Mohammad A. Abdallah, filed on Mar. 25, 2011, and which is incorporated herein in its entirety.

CROSS REFERENCE TO RELATED APPLICATION

This application is related to co-pending commonly assigned US Patent Application serial number 2009/0113170, titled "APPARATUS AND METHOD FOR PROCESSING AN INSTRUCTION MATRIX SPECIFYING PARALLEL IN DEPENDENT OPERATIONS" by Mohammad A. Abdallah, filed on Apr. 12, 2007, and which is incorporated herein in its entirety.

This application is related to co-pending commonly assigned US Patent Application serial number 2010/0161948, titled "APPARATUS AND METHOD FOR PROCESSING COMPLEX INSTRUCTION FORMATS IN A MULTITHREADED ARCHITECTURE SUPPORTING VARIOUS CONTEXT SWITCH MODES AND VIRTUALIZATION SCHEMES" by Mohammad A. Abdallah, filed on Nov. 14, 2007, and which is incorporated herein in its entirety.

FIELD OF THE INVENTION

The present invention is generally related to digital computer systems, more particularly, to a system and method for selecting instructions comprising an instruction sequence.

BACKGROUND OF THE INVENTION

Processors are required to handle multiple tasks that are either dependent or totally independent. The internal state of such processors usually consists of registers that might hold different values at each particular instant of program execution. At each instant of program execution, the internal state image is called the architecture state of the processor.

When code execution is switched to run another function (e.g., another thread, process or program), then the state of the machine/processor has to be saved so that the new function can utilize the internal registers to build its new state. Once the new function is terminated then its state can be discarded and the state of the previous context will be restored and execution resumes. Such a switch process is called a context switch and usually includes 10's or hundreds of cycles especially with modern architectures that employ large number of registers (e.g., 64, 128, 256) and/or out of order execution.

In thread-aware hardware architectures, it is normal for the hardware to support multiple context states for a limited number of hardware-supported threads. In this case, the hardware duplicates all architecture state elements for each supported thread. This eliminates the need for context switch when executing a new thread. However, this still has multiple draw backs, namely the area, power and complexity of duplicating all architecture state elements (i.e., registers) for each additional thread supported in hardware. In addition, if the number of software threads exceeds the number of explicitly supported hardware threads, then the context switch must still be performed.

This becomes common as parallelism is needed on a fine granularity basis requiring a large number of threads. The hardware thread-aware architectures with duplicate context-state hardware storage do not help non-threaded software code and only reduces the number of context switches for software that is threaded. However, those threads are usually constructed for coarse grain parallelism, and result in heavy software overhead for initiating and synchronizing, leaving fine grain parallelism, such as function calls and loops parallel execution, without efficient threading initiations/auto generation. Such described overheads are accompanied with the difficulty of auto parallelization of such codes using state of the art compiler or user parallelization techniques for non-explicitly/easily parallelized/threaded software codes.

SUMMARY OF THE INVENTION

In one embodiment, the present invention is implemented as a system for executing instructions using a plurality of register file segments for a processor. The system includes a global front end scheduler for receiving an incoming instruction sequence, wherein the global front end scheduler partitions the incoming instruction sequence into a plurality of code blocks of instructions and generates a plurality of inheritance vectors describing interdependencies between instructions of the code blocks. The system further includes a plurality of virtual cores of the processor coupled to receive code blocks allocated by the global front end scheduler, wherein each virtual core comprises a respective subset of resources of a plurality of partitionable engines, wherein the code blocks are executed by using the partitionable engines in accordance with a virtual core mode and in accordance with the respective inheritance vectors. A plurality register file segments are coupled to the partitionable engines for providing data storage.

Other embodiments of the present invention utilize a common scheduler, a common register file and a common memory subsystem to implement fragmented address spaces for multiple partitionable engines of processor. The partitionable engines can be used to implement a plurality of virtual cores. Fragmentation enables the scaling of microprocessor performance by allowing additional virtual cores to cooperatively execute instruction sequences. The fragmentation hierarchy can be the same across each cache hierarchy (e.g., L1 cache, L2 cache, and the common register file). The fragmentation hierarchy can divide the address space into fragments using address bits, where the address bits are used such that the fragments are above cache line boundaries and below page boundaries. Each fragment can be configured to utilize a multiport bank structure for storage.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1A:
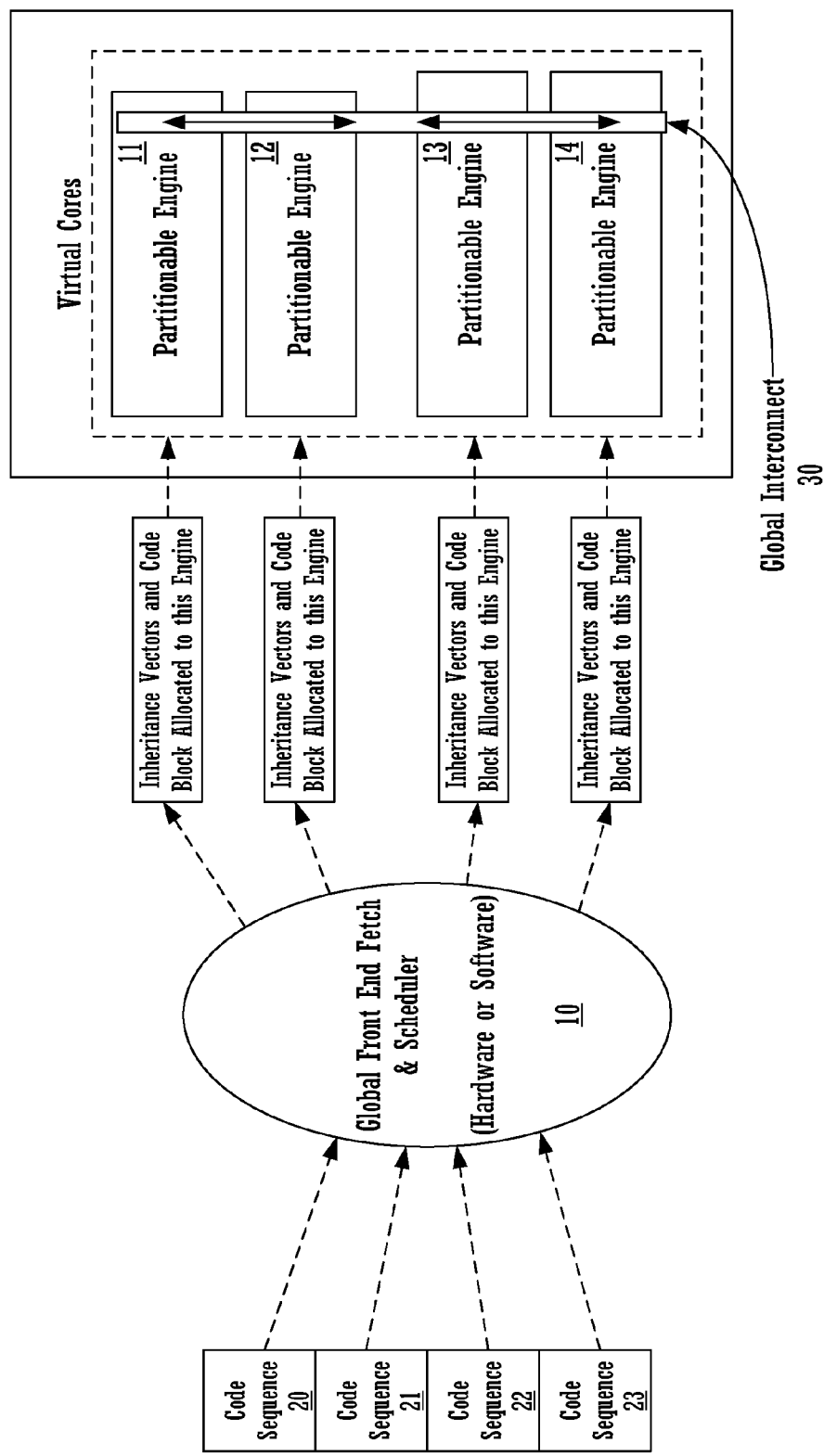
FIG. 1A shows an overview of the manner in which the global front end generates code blocks and inheritance vectors to support the execution of code sequences on their respective partitionable engines.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention utilize a common global front end scheduler, a plurality of segmented register files, and a memory subsystem to implement fragmented address spaces for multiple cores of a multicore processor. In one embodiment, fragmentation enables the scaling of microprocessor performance by allowing additional virtual cores (e.g., soft cores) to cooperatively execute instruction sequences comprising one or more threads. The fragmentation hierarchy is the same across each cache hierarchy (e.g., L1 cache, L2 cache, and the common register file). The fragmentation hierarchy divides the address space into fragments using address bits, where the address bits are used such that the fragments are identified by bits that are above cache line boundaries and below page boundaries. Each fragment is configured to utilize a multiport bank structure for storage. Embodiments of the present invention are further described in the FIGS. 1A and 1B below.

FIG. 1A shows an overview diagram of a processor in accordance with one embodiment of the present invention. As depicted in FIG. 1A, the processor includes a global front end fetch and scheduler 10 and a plurality of partitionable engines 11-14.

FIG. 1A shows an overview of the manner in which the global front end generates code blocks and inheritance vectors to support the execution of code sequences on their respective partitionable engines. Each of the code sequences 20-23 can belong to the same logical core/thread or to different logical cores/threads, depending upon the particular virtual core execution mode. The global front end fetch and scheduler will process the code sequences 20-23 to generate code blocks and inheritance vectors. These code blocks and inheritance vectors are allocated to the particular partitionable engines 11-14 as shown.

The partitionable engines implement virtual cores, in accordance with a selected mode. A partitionable engine includes a segment, a fragment and a number of execution units. The resources within the partitionable engines can be used to implement virtual cores that have multiple modes.

As provisioned by the virtual core mode, one soft core, or many soft cores, can be implemented to support one logical core/thread. In the FIG. 1A embodiment, depending on the selected mode, the virtual cores can support one logical core/thread or four logical cores/threads. In an embodiment where the virtual cores support four logical cores/threads, the resources of each virtual core are spread across each of the partitionable engines. In an embodiment where the virtual cores support one logical core/thread, the resources of all the engines are dedicated to that core/thread. The engines are partitioned such that each engine provides a subset of the resources that comprise each virtual core. In other words, a virtual core will comprise a subset of the resources of each of the engines 11-14. Communication between the resources of each of the engines 11-14 is provided by a global interconnection structure 30 in order to facilitate this process. Alternatively, the engines 11-14 can be used to implement a physical mode where the resources of the engines 11-14 are dedicated to support the execution of a dedicated core/thread. In this manner, the soft cores implemented by the engines comprise virtual cores that have resources spread across each of the engines. The virtual core execution modes are further described in the following figures below.

It should be noted that in a conventional core implementation, only resources within one core/engine is solely allocated to one logical thread/core. In contrast, in embodiments of the present invention, the resources of any engine/core can be partitioned to, collectively with other engine/core partitions, instantiate a virtual core that is allocated to one logical thread/core. Additionally, embodiments of the present invention can implement multiple virtual execution modes in which those same engines can be partitioned to support many dedicated cores/threads, many dynamically allocated cores/threads, or an embodiment where all of the resources of all engines support the execution of a single core/thread. These embodiments are further described in the descriptions below.

Figure 1B:
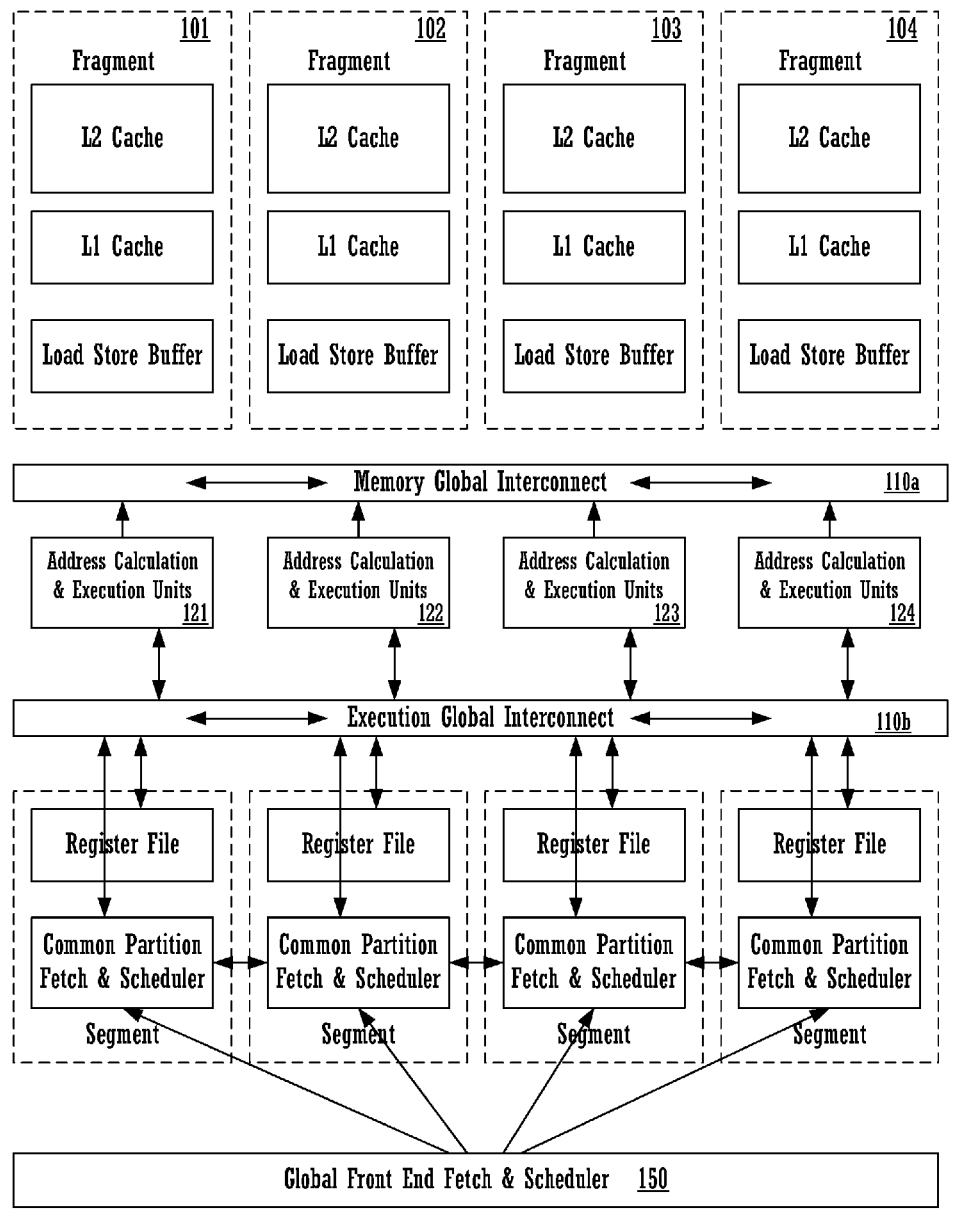
FIG. 1B shows an overview diagram of partitionable engines and their components, including segmented scheduler and register files, global interconnects and a fragmented memory subsystem for a multicore processor in accordance with one embodiment of the present invention.

FIG. 1B shows an overview diagram of partitionable engines and their components, including segmented scheduler and register files, global interconnects and a fragmented memory subsystem for a multicore processor in accordance with one embodiment of the present invention. As depicted in FIG. 1, four fragments 101-104 are shown. The fragmentation hierarchy is the same across each cache hierarchy (e.g., L1 cache, L2 cache, and the load store buffer). Data can be exchanged between each of the L1 caches, each of the L2 caches and each of the load store buffers via the memory global interconnect 110a.

The memory global interconnect comprises a routing matrix that allows a plurality of cores (e.g., the address calculation and execution units 121-124) to access data that may be stored at any point in the fragmented cache hierarchy (e.g., L1 cache, load store buffer and L2 cache). FIG. 1 also depicts the manner whereby each of the fragments 101-104 can be accessed by address calculation and execution units 121-124 via the memory global interconnect 110a.

The execution global interconnect 110b similarly comprises a routing matrix allows the plurality of cores (e.g., the address calculation and execution units 121-124) to access data that may be stored at any of the segmented register files. Thus, the cores have access to data stored in any of the fragments and data stored in any of the segments via the memory global interconnect 110a or the execution global interconnect 110b. Additionally, it should be noted that in one embodiment, another global interconnect exists between each of the common partition fetch and schedulers. This is shown by the horizontal arrows between and connecting each common partition fetch and scheduler.

FIG. 1B further shows a global front end Fetch & scheduler 150 which has a view of the entire machine and which manages the utilization of the register files segments and the fragmented memory subsystem. Address generation comprises the basis for fragment definition. The global front end Fetch & scheduler functions by allocating instruction sequences to each segment's partition scheduler. The common partition scheduler then dispatches those instruction sequences for execution on the address calculation and execution and execution units 121-124.

It should be noted that in one embodiment, the functionality of the common partition fetch and schedulers can be incorporated into the global front end scheduler 150. In such an embodiment, the segments would not include respective common partition fetch and schedulers, and there would be no need for an interconnect between them.

Additionally, it should be noted that the partitionable engines shown in FIG. 1A can be nested in a hierarchal way. In such an embodiment, a first level partitionable engine would include a local front end fetch and scheduler and multiple secondary partitionable engines connected to it.

Figure 2:
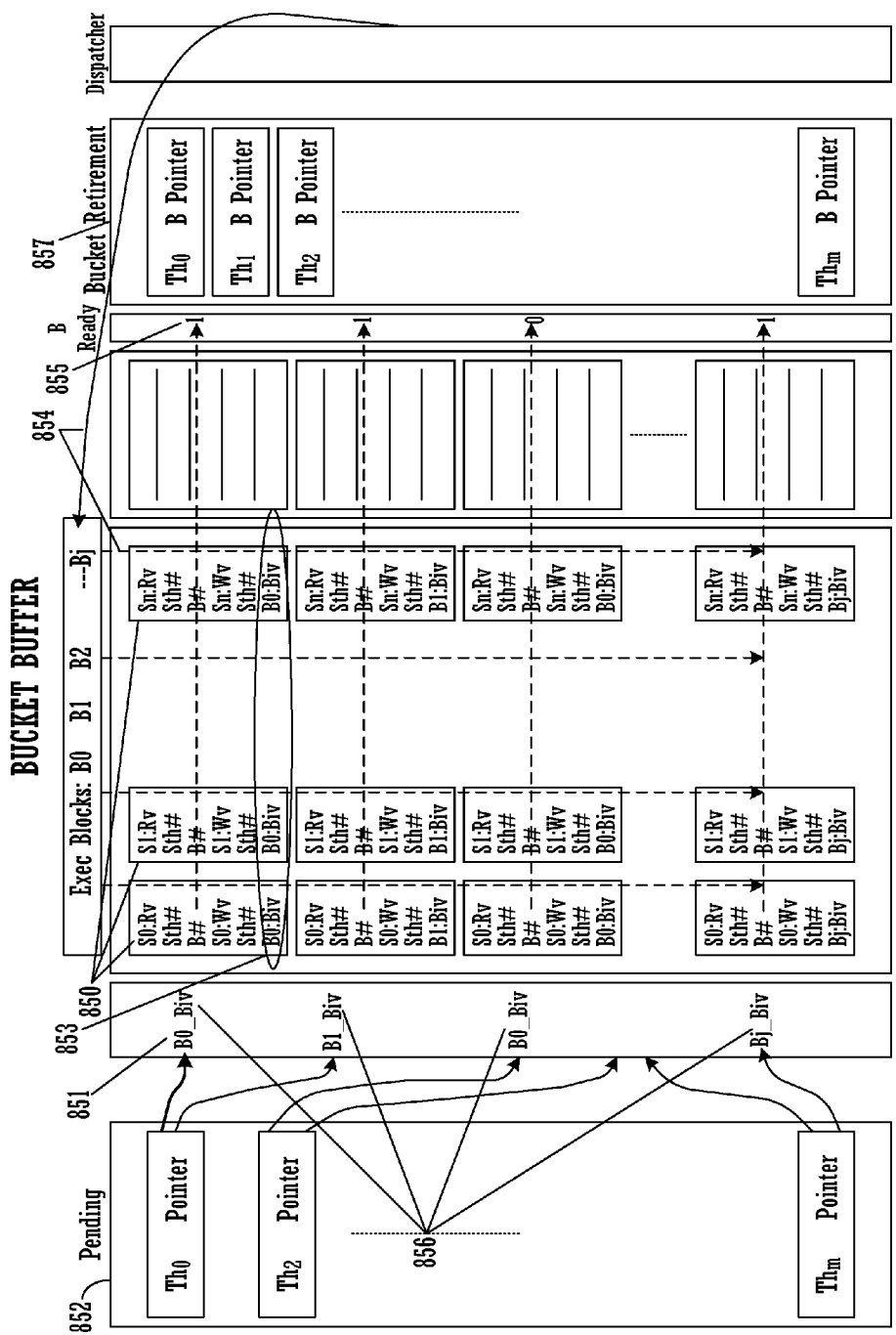
FIG. 2 shows a scheduler flow diagram in accordance with one embodiment of the present invention.

FIG. 2 shows a scheduler flow diagram in accordance with one embodiment of the present invention. As depicted in FIG. 2, a bucket buffer is shown that includes Speculative Thread Bucket-pointers, Bucket Sources and destinations lists. The scheduler and execution buckets include a bucket dispatch selector and the virtual register match and read, including the possibility of a register hierarchy and a register cache. The Back end is where executed buckets are logged and exception ordering is enforced before retirement. The register hierarchy/cache also serves as an intermediate storage for the executed bucket results until they are non-speculative and can update the architecture state. The following discloses one possible implementation of the front end, the dispatch stage and the backend where executed buckets are logged.

FIG. 2 shows the manner in which the concept scales from a bucket buffer managing a small number of closely coupled threads into hardware circuits that manage multiple bucket buffers and threads. Those circuits that can be expanded to process larger numbers of threads that might have less close interaction are described as a global front end (e.g., global front end scheduler 150 shown in FIG. 1).

The process starts by fetching a new thread Matrix/bucket/block, and then the new thread bucket is assigned into a vacant bucket slot in the bucket buffer. Each of the thread allocation pointers in the thread allocation pointer array 852 composes an interval of buckets such that the thread is allowed physically to place its blocks/buckets of instruction in it. Each of those threads keeps allocating buckets into the bucket buffer array inside its corresponding interval of contiguous space in round-robin fashion. The buckets/blocks inside each thread space get assigned a new number 852 that is incremented each time a new bucket/block gets assigned. For each valid source in the bucket 850. The valid sources for each bucket has a valid read bit "Rv" indicating that this source is needed for the instructions inside this bucket. By the same convention, each destination register that is to be written back by instructions in this bucket has a valid bit "Wv" set in the bucket and it has a field in a destination inheritance vector 853. When a new bucket is to be fetched into the bucket buffer it inherits the destination inheritance vector from the previous allocated bucket pointed at by the thread bucket allocation pointer 852. The inheritance vector is copied from the previously allocated bucket and then it overwrites those valid destination fields that correspond to the registers which will be updated by those bucket instructions. The valid destinations will be labeled with the current bucket number, while the invalid destinations are copied from the corresponding inheritance vector inside the bucket. Then the thread bucket pointer is updated for the new fetched bucket by incrementing its pointer (it wraps around within its interval).

In the bucket dispatch and execute stage, whenever a bucket is executed without any exception handling, then the bucket execution flag (containing the bucket number) 854 is set and broadcasted through out the bucket buffer and is latched/monitored within each bucket that has a source with that bucket number as a source. It is also possible to pass other related information along the bucket number, such as information about virtual registers locations. When all the execution flags of the sources buckets are set within a bucket, then that bucket ready bit 855 is set and the bucket is ready to be dispatched and executed. When the bucket executes without any exception and it is ready to update the architecture state in the sequential order of the program, then it retires the bucket and the retirement thread pointer 857 is incremented to the next bucket in the array. The retired bucket location can be assigned to a new bucket.

Those closely related threads can all coexist inside the Matrix/bucket/block buffer; each thread will occupy an interval of consecutive buckets that belongs to that thread. The allocation pointer of that thread moves inside this interval of buckets in a round robin fashion fetching new instruction buckets and allocating them inside the thread interval in the described round robin fashion. With such interval sectioning, the whole bucket buffer is divided dynamically with different or equal interval lengths of buckets.

The concept of inheritance vector is introduced here for the instruction bucket as well as for the thread. Each instruction matrix/block/bucket writes into particular registers among the architectural registers. Each new bucket upon allocation stage updates this inheritance vector writing the thread and bucket number of its own into this vector leaving the fields for the registers that it does not write into un-updated. This bucket inheritance vector B_iv 856 is forwarded from each bucket to the next one in program order. In FIG. 2 each matrix writes its own number into the architecture destination registers if the instructions in that matrix write into those registers, otherwise it inherits the value from the B_iv of the previous bucket in that thread.

Figure 3:
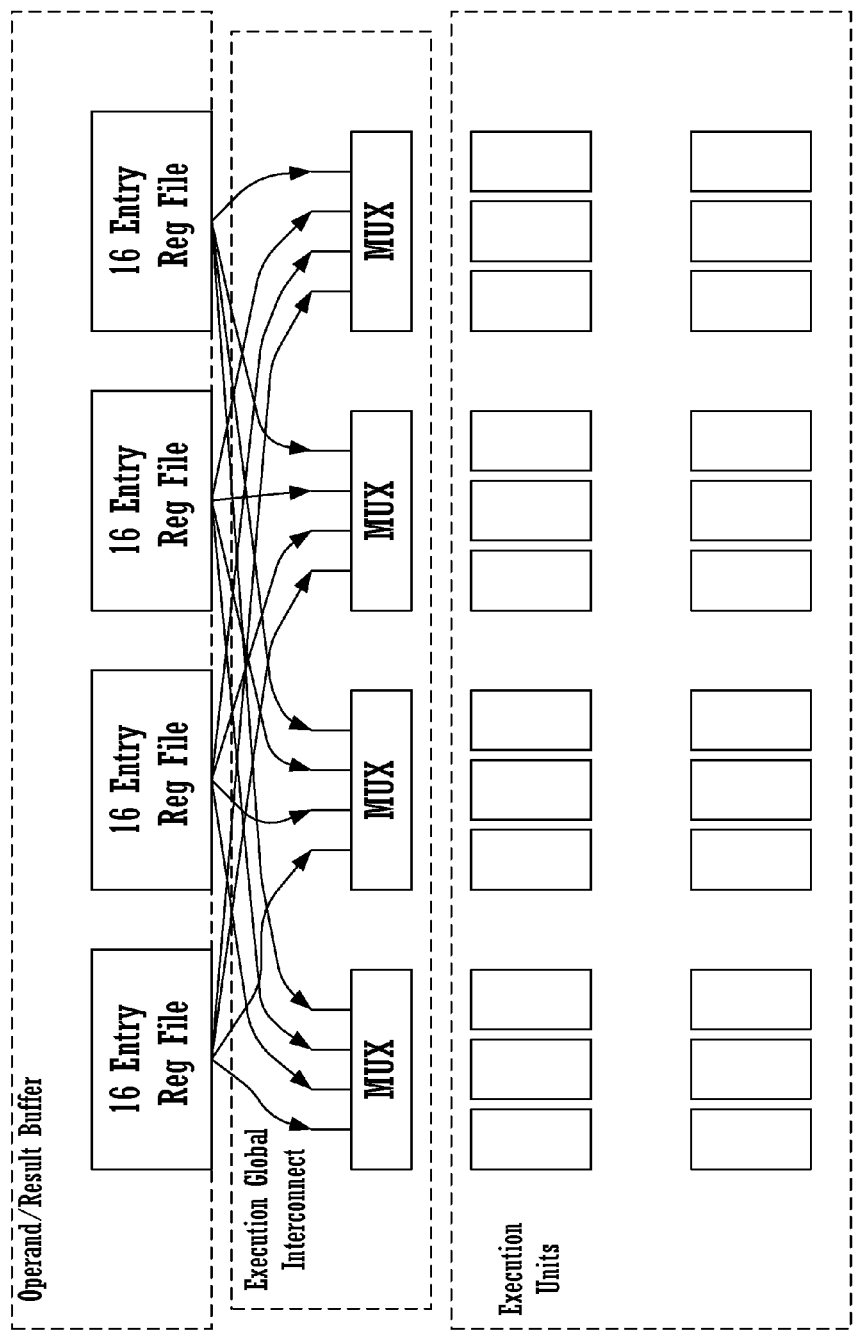
FIG. 3 shows a diagram of exemplary hardware circuits that shows a segmented register file storing operands and results with an interconnect in accordance with one embodiment of the present invention.

FIG. 3 shows a diagram of exemplary hardware circuits that shows a segmented register file storing operands and results with an interconnect in accordance with one embodiment of the present invention. FIG. 3 shows an operand result buffer coupled via the execution global interconnect to a plurality of execution units.

Figure 4:
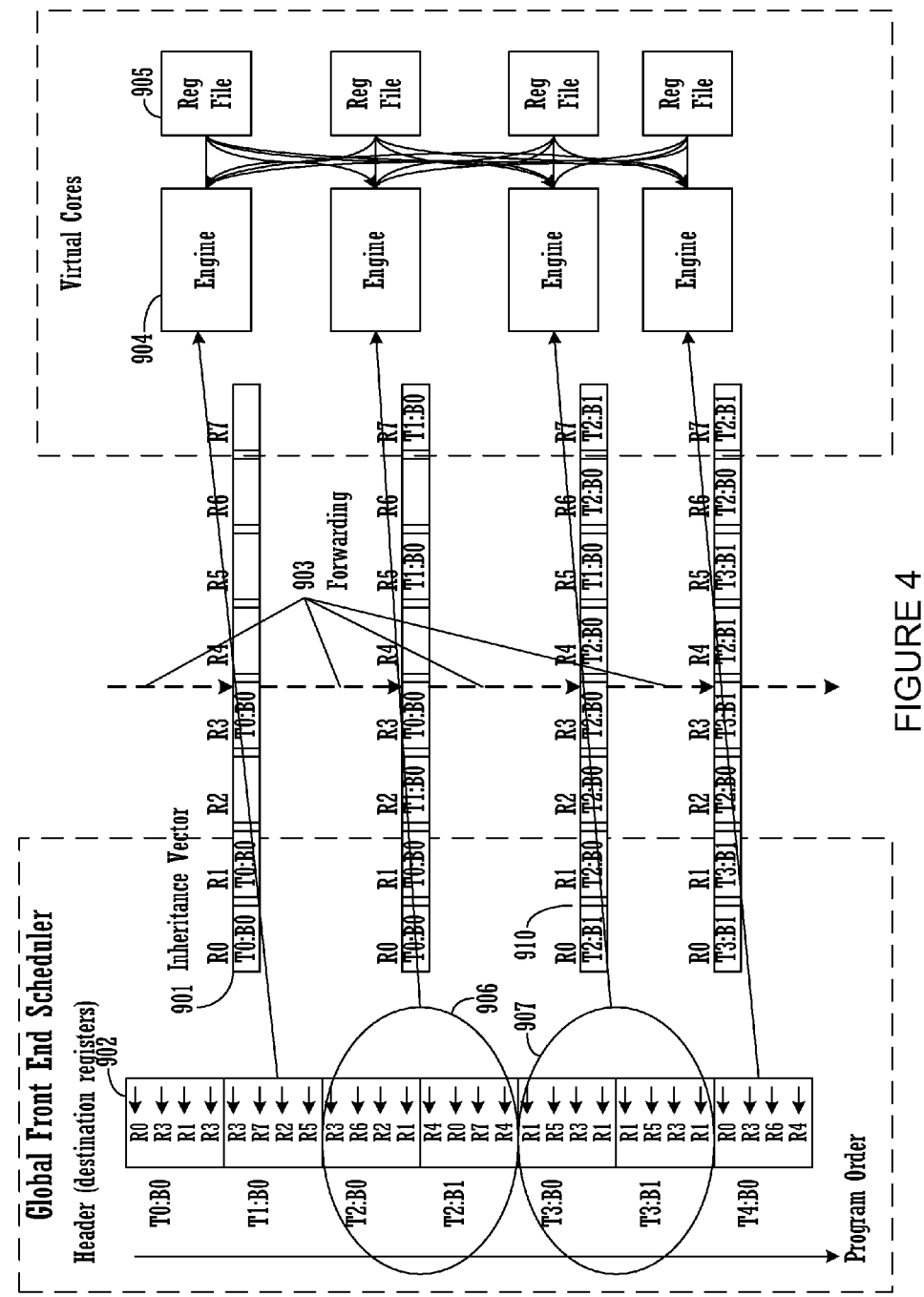
FIG. 4 shows a diagram depicting a global front end Fetch & scheduler in accordance with one embodiment of the present invention.

FIG. 4 shows a diagram depicting a global front end scheduler in accordance with one embodiment of the present invention. The global front end scheduler is configured to process larger numbers of threads that might have less close interaction (e.g., global front in scheduler 150 shown in FIG. 1). This diagram shows how a sequence of instructions from one logical core is distributed across many virtual cores. This process would be repeated for each logical core present in the machine. It should be noted that the FIG. 4 "Engine" comprises the components of a virtual core, where the register file is explicitly depicted to show aspects of inter virtual core communication at the register file level.

For example, as depicted in FIG. 4, the global front end scheduler can process a thread header 902 but does not need to process the actual instructions within the thread to enforce the dependency check across those distant threads. The header of the thread and the sub headers of its buckets contain only information about the architecture registers that those threads and buckets write into (destination registers of those instructions). There is no need in those headers to include actual instructions or sources of those instructions. Actually it is enough to list those destination registers or a bit vector where each individual bit is set for each register that is a destination for an instruction. The header does not need to be physically placed as a header for the instructions; it can be any formatted packet or compact representation of the destination registers of the instructions within the threads, which may or may not be stored with the rest of the instructions information.

This global front-end fetches only the headers of the threads/blocks in program order and generates dynamic thread and/or bucket inheritance vectors 901 (Tiv and/or Biv). Each time a new thread is allocated, those inheritance vectors are forwarded by keeping the old fields that the current thread bucket will not write to or update as shown by 903. Those inheritance vectors are distributed to a large number of engines/cores or processors 904 each of which might include a local front-end and a fetch unit (which will fetch and store the actual instructions produced by the dependency vector for each bucket) and a local matrix/block/bucket buffer with local register files 905. The local front-ends then fetch the actual instructions and use the information from the inheritance vectors obtained from the global front end to fill the dependency information for the instruction sources of the instructions that are brought into those engines for execution. FIG. 4 illustrates a global front-end implementation and the way it disseminates the inheritance vectors to the different engines 904 using only concise information about the instructions (e.g., which is just the registers that those instructions write into). Other information that is of help to place in the header is that information about a change in the control path within or across the threads. A global branch predictor can be used to predict the flow of control across those threads so such headers can include the branching destinations and offsets. In addition to the branch predictor to determine control flow, the hardware/compiler can decide to dispatch independent threads across the 2 control paths of a branch. In such case it will later merge the execution of those 2 paths using the inheritance vector. FIG. 4 also shows the forwarding process when a header of a new thread is fetched by the global front end. Thread 2 (906) for example will update the corresponding inheritance vector 901 that is forwarded to it resulting in vector 910 where registers 1, 2, 3, 4, 6, 0 and 7 are updated with T2 labels. Note that in 910 register 5 was not written by T2 buckets and thus its label was inherited from a previous inheritance vector.

One interesting observation is that the register files allow cross communication among the cores/engines. An early request (to reduce the access latency) of the registers that are needed from cross engines can be placed as soon as the instruction buckets of the thread are fetched and allocated in the local bucket buffer. At that time the source dependency information is populated such that cross engine threads references can be issued at that time probably long before the actual instructions are dispatched for execution. In any case, the instruction will not be dispatched until the cross referenced source is forwarded and arrived. This cross referenced source can be stored in the local multi-threaded register file or register cache. Although this cross referenced source can be stored in a buffer similar to the load store buffer (it can reuse the load store buffer physical storage and dependency check mechanisms but as a register load instead of memory load). Many topologies can be used to connect the register files across the engines/cores, which may be a ring topology or cross bar topology or mesh routed interconnect.

The following discussion can illustrate how register file segmentation can be used inside an engine and also across engines. When the bucket is dispatched, its sources are sent to both (simultaneously or sequentially) to the register file and the register cache. If the register file is physically unified and has direct support for threading, then the operand is read directly from the corresponding thread register section. If the register file is a virtual register, including a physically segmented register file that uses tags, then a tag match has to be done as a part of the virtual register read. If the tag matches, then the read happens from the segmented register file.

Disclosed is register architecture that supports software threads, hardware generated threads, VLIW execution, SIMD & MIMD execution as well as emulation of out-of-order super-scalar execution. Although it is physically segmented, it looks as a unified architecture resource. This segmented register is part of the virtual register file which might include a register hierarchy and a register cache as well as mechanisms to store and check register tags. The tag access can be eliminated if we use a location based scheme that takes advantage of the dependency inheritance vector. The scheme works such that when the executed bucket number is broadcasted during dispatch stage all the sources of subsequent instructions perform a CAM (content addressable match) which compares their sources buckets with the just dispatched/executed bucket to set the ready flag for that source. Here the physical location of where that bucket executed can also be propagated along with the register number so that any ambiguity is resolved.

For example, consider an implementation where there are 4 register file segments, each containing 16 registers. For example upon dispatching a bucket # x to section 2 the bucket number x is broadcasted to the bucket buffer and also the segment #2 is broadcasted with it such that all sources that have a dependency on bucket x will record that it wrote all its registers in segment 2. When time comes to dispatch those instructions, they know that they need to read their register from segment 2 and not any other segment, even though the same register number exists in the other segments. This also applies to the register cache to avoid using tags. We can extend this concept to the global front end where in addition to the thread information the inheritance vector can specify in which engine the instruction bucket writing to this register was allocated.

Figure 5:
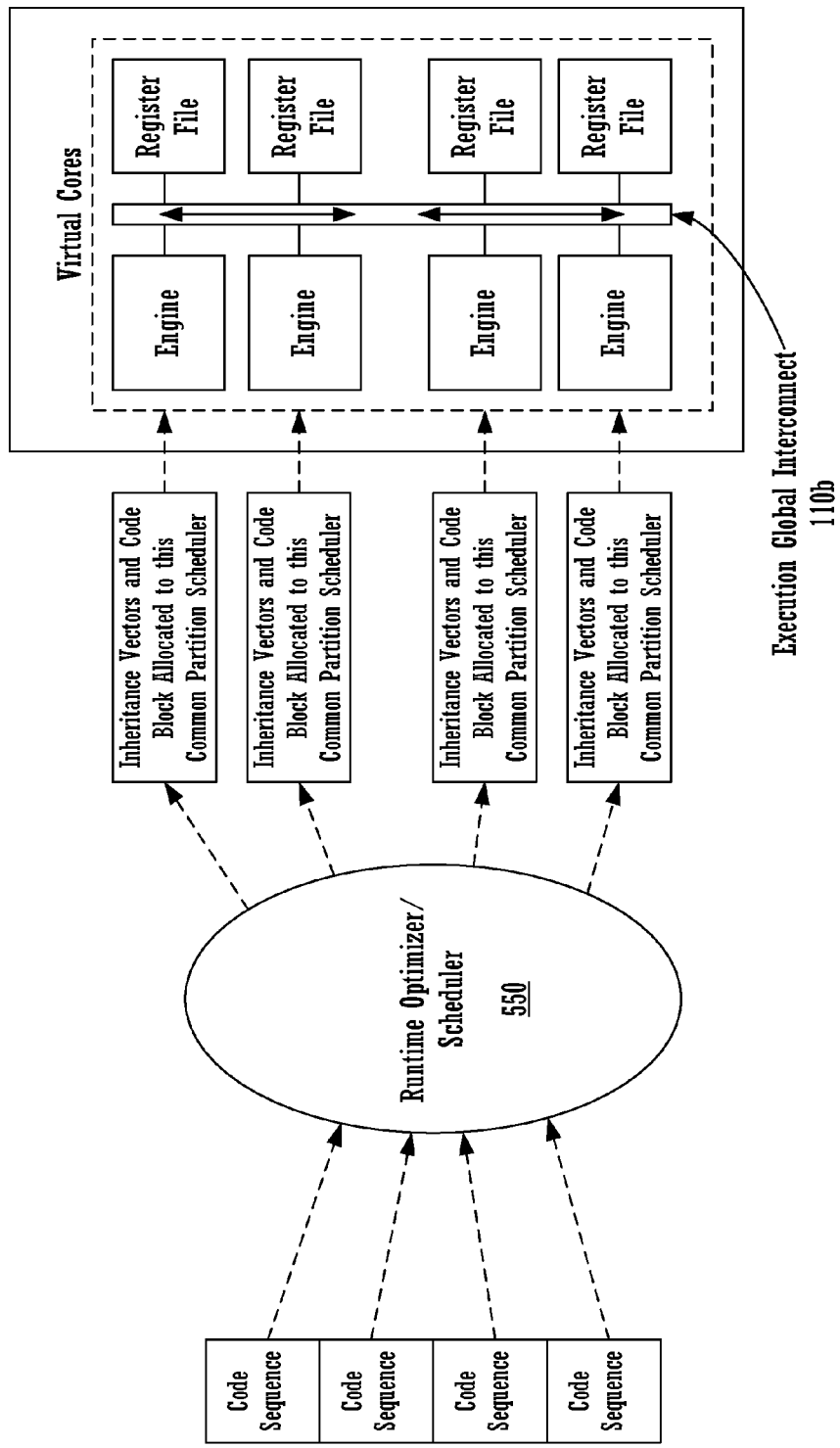
FIG. 5 shows an alternative implementation of the distribution of instructions across many virtual cores in accordance with one embodiment of the present invention.

FIG. 5 shows an alternative implementation of the distribution of instructions across many virtual cores in accordance with one embodiment of the present invention. FIG. 5 shows a runtime optimizer scheduler 550 functioning by distributing inheritance vectors encode segments to the virtual cores. In one embodiment, the optimizer looks at a number of code blocks of instructions and reschedules instructions across all of the code blocks to create code segments and inheritance vectors. The goal of the Optimizer would be to maximize the efficiency of execution of the overlapped execution of code segments on their respective virtual cores.

Figure 6:
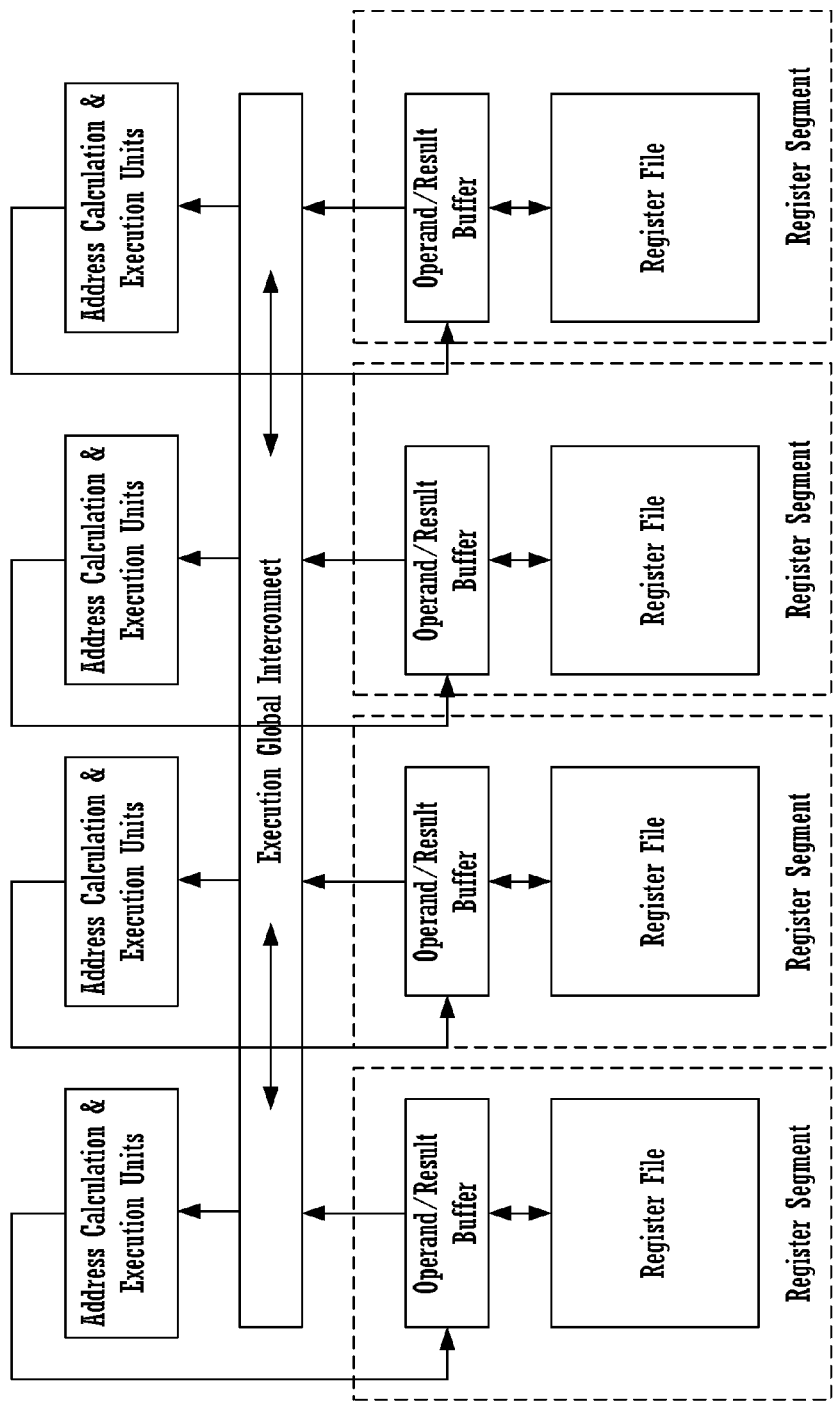
FIG. 6 shows a plurality of register segments with a corresponding plurality of register files and operand & result buffers in accordance with one embodiment of the present invention.

FIG. 6 shows a plurality of register segments with a corresponding plurality of register files and operand result buffers in accordance with one embodiment of the present invention. As depicted in FIG. 6, an execution global interconnect connects each register segment to a plurality of address calculation and execution units.

The register segments FIG. 6 can be used to implement one of 3 execution modes: either by being grouped together by the compiler/programmer to form a MIMD super instruction matrix, or each matrix can be executed independently in a threaded mode where separate threads execute simultaneously on each of the 4 hardware sections. The last execution mode possible is the ability to dynamically execute 4 different instruction matrices from a single thread using a hardware dependency check to insure no dependency exists between those different matrices that execute simultaneously on the 4 different hardware sections The register files in FIG. 6 may be alternately configured depending upon the execution mode. In one mode, the register files are viewed as either an MIMD sectioned register file serving a MIMD width of 4 sections or they serve as 4 individual register files, each serving a separate thread. The register files can also support a dynamic execution mode where the 4 sections are one unified register file where data written to any register in a particular section is accessible by all units in the other sections. Switching between those modes can be seamless as different executing modes can alternate between individual thread baseline instruction matrix and MIMD super instruction matrix threads.

In a multithread execution mode, each register file and its execution unit that executes a thread is totally independent of other register files and their threads. This is similar to each thread having its own register state. However, dependency between those threads can be specified. Each matrix that belongs to a thread will execute in the execution unit of that thread's register file. If only one thread or non-threaded single program is executed on the hardware, then the following method is used to allow parallel matrices belonging to that single thread/program to be able to access the results written into the registers in the other sections. The way this is done is by allowing any matrix writing results into any one of the 4 register file sections to generate copies of those registers in the other register file sections. Physically this is done by extending the write ports of each section into the remaining sections. However, this is not scalable, as we cannot build an efficient register file with each memory cell having as many as 4 times the write ports as needed for one section alone. We present a mechanism where the register file is built such that it will not be impacted with such single thread register-broadcast extension.

It should be noted that additional aspects regarding register segments as used in embodiments of the present invention can be found in US Patent Application serial number 2010/0161948, titled "APPARATUS AND METHOD FOR PROCESSING COMPLEX INSTRUCTION FORMATS IN A MULTITHREADED ARCHITECTURE SUPPORTING VARIOUS CONTEXT SWITCH MODES AND VIRTUALIZATION SCHEMES" by Mohammad A. Abdallah, filed on Nov. 14, 2007.

Figure 7:
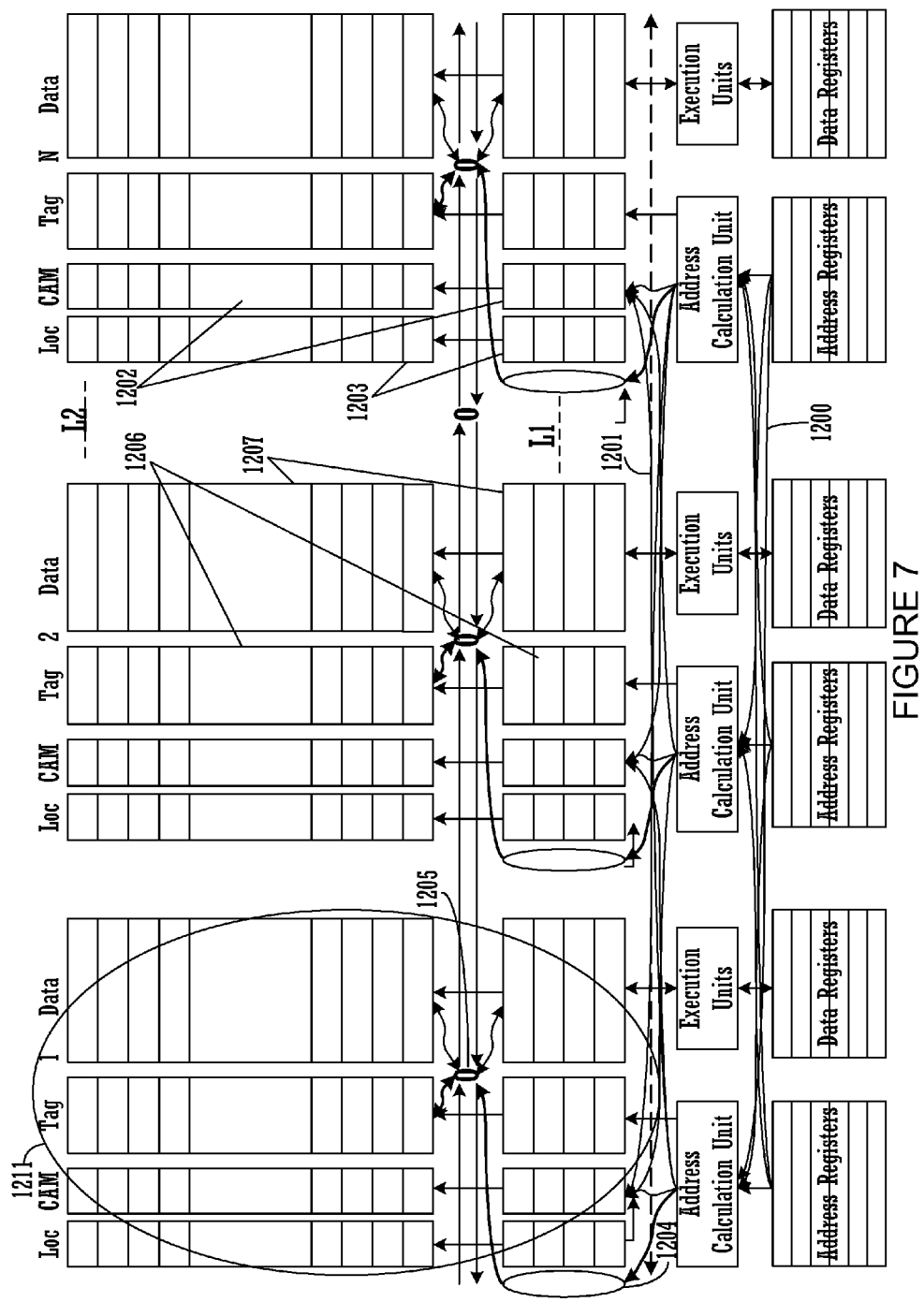
FIG. 7 shows a more detailed diagram of a fragmented memory subsystem for a multicore processor in accordance with one embodiment of the present invention.

FIG. 7 shows a more detailed diagram of a fragmented memory subsystem for a multicore processor in accordance with one embodiment of the present invention. FIG. 7 shows a comprehensive scheme and implementation of the synchronization scheme among threads and/or among loads and stores in general. The scheme describes a preferred method for synchronization and disambiguation of memory references across load/store architectures and/or across memory references and/or threads' memory accesses. In FIG. 7, we show multiple segments of register files (address and or data registers), execution units, address calculation units, and fragments of level 1 caches and/or load store buffers and level 2 caches and address register interconnects 1200 and address calculation unit interconnects 1201. Those fragmented elements could be constructed within one core/processor by fragmenting and distributing its centralized resources into several engines or they can be constructed from elements of different cores/processors in multi-core/multi-processor configurations. One of those fragments 1211 is shown in the figure as fragment number 1; the fragments can be scaled to a large number (in general to N fragments as shown in the figure).

This mechanism also serves also as a coherency scheme for the memory architecture among those engines/cores/processors. This scheme starts by an address request from one of the address calculation units in one fragment/core/processor. For example, assume the address is requested by fragment 1 (1211). It can obtain and calculate its address using address registers that belong to its own fragment and or from registers across other fragments using the address interconnect bus 1200. After calculating the address it creates the reference address of either 32-bit address or 64-bit address that is used to access caches and memory. This address is usually fragmented into a tag field and a set and line fields. This particular fragment/engine/core will store the address into its load store buffer and/or L1 and/or L2 address arrays 1202, at the same time it will create a compressed version of the tag (with smaller number of bits than the original tag field of the address) by using a compression technique.

More the different fragments/engines/cores/processors will use the set field or a subset of the set field as an index to identify which fragment/core/processor the address is maintained in. This indexing of the fragments by the address set field bits ensures exclusiveness of ownership of the address in a particular fragment/core/engine even though the memory data that corresponds to that address can live in another or multiple other fragments/engines/cores/processors. Even though the address CAM/tag arrays 1202/1206 are shown in each fragment to be coupled with the data arrays 1207, they might be only coupled in physical proximity of placement and layout or even by the fact that both belong to a particular engine/core/processor, but there is no relation between addresses kept in the address arrays and the data in the data arrays inside one fragment.

Figure 8:
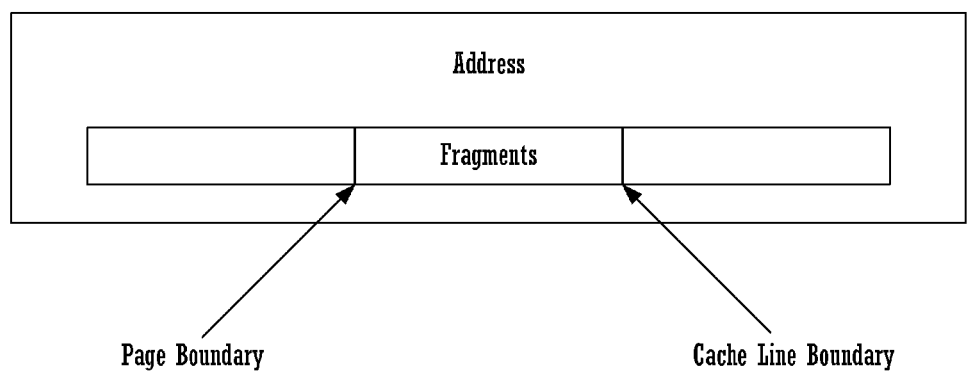
FIG. 8 shows a diagram depicting how bits of an address can be used by address generation to enumerate fragments in accordance with one embodiment of the present invention.

FIG. 8 shows a diagram depicting how bits of an address can be used by address generation to enumerate fragments in accordance with one embodiment of the present invention. In the present embodiment, fragments are defined by the address bits that are above page boundaries and that are below cache line boundaries, as depicted in FIG. 8. The present invention advantageously stays above the page boundaries to avoid causing TLB misses during the translation from the virtual addresses to physical addresses. The process stays below the cache line boundary in order to have complete cache lines in order to correctly fit within the hardware cache hierarchy. For example, in a system that employs 64 byte cache lines, the fragment boundary would avoid the last six address bits. In comparison, a system that employs 32 byte cache lines, the fragment boundary would avoid the last five bits. Once defined, the fragment hierarchy is the same across all cache hierarchies of the processor.

Figure 9:
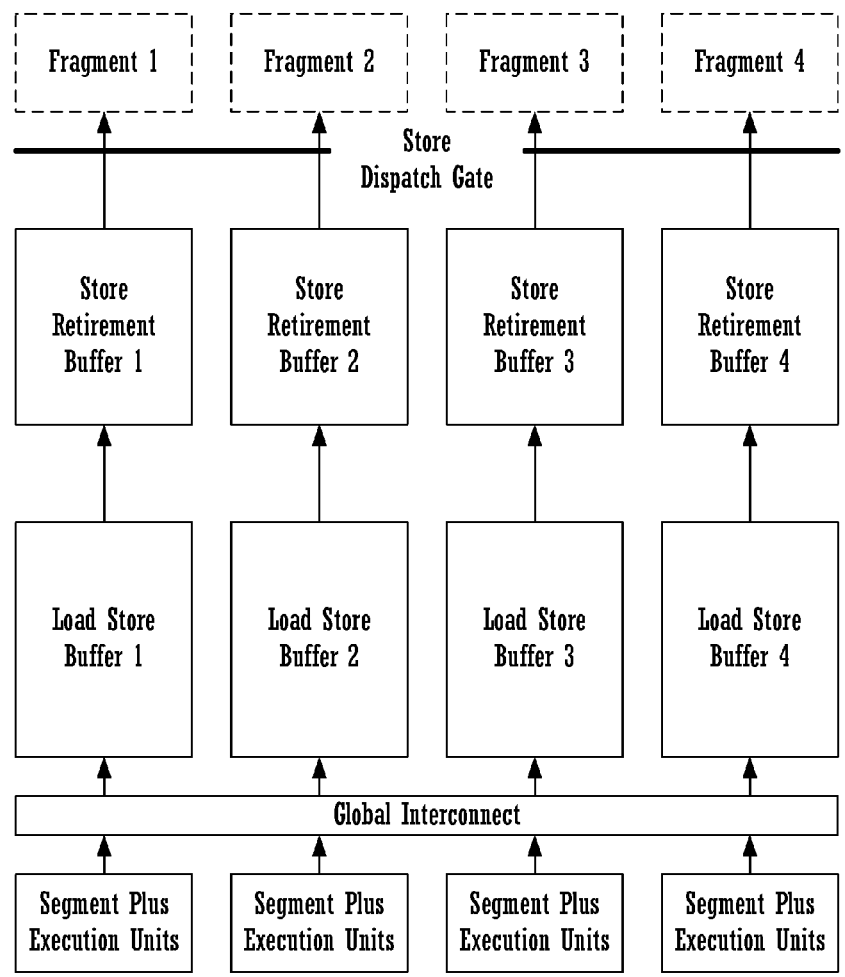
FIG. 9 shows a diagram of how loads and stores are handled by embodiments of the present invention.

FIG. 9 shows a diagram of how loads and stores are handled by embodiments of the present invention. As depicted in FIG. 9, each fragment is associated with its load store buffer and store retirement buffer. For any given fragment, loads and stores that designate an address range associated with that fragment or another fragment are sent to that fragment's load store buffer for processing. It should be noted that they may arrive out of order as the cores execute instructions out of order. Within each core, the core has access to not only its own register file but each of the other cores' register files.

Embodiments of the present invention implement a distributed load store ordering system. The system is distributed across multiple fragments. Within a fragment, local data dependency checking is performed by that fragment. This is because the fragment only loads and stores within the store retirement buffer of that particular fragment. This limits the need of having to look to other fragments to maintain data coherency. In this manner, data dependencies within a fragment are locally enforced.

With respect to data consistency, the store dispatch gate enforces store retirement in accordance with strict in-program order memory consistency rules. Stores arrive out of order at the load store buffers. Loads arrive out of order also at the load store buffers. Concurrently, the out of order loads and stores are forwarded to the store retirement buffers for processing. It should be noted that although stores are retired in order within a given fragment, as they go to the store dispatch gate they can be out of order from the multiple fragments. The store dispatch gate enforces a policy that ensures that even though stores may reside across store retirement buffers out of order, and even though the buffers may forward stores to the store dispatch gate out of order with respect to other buffers' stores, the dispatch gate ensures that they are forwarded to fragment memory strictly in order. This is because the store dispatch gate has a global view of stores retiring, and only allows stores to leave to the global visible side of the memory in order across all the fragments, e.g., globally. In this manner, the store dispatch gate functions as a global observer to make sure that stores ultimately return to memory in order, across all fragments.

Figure 10:
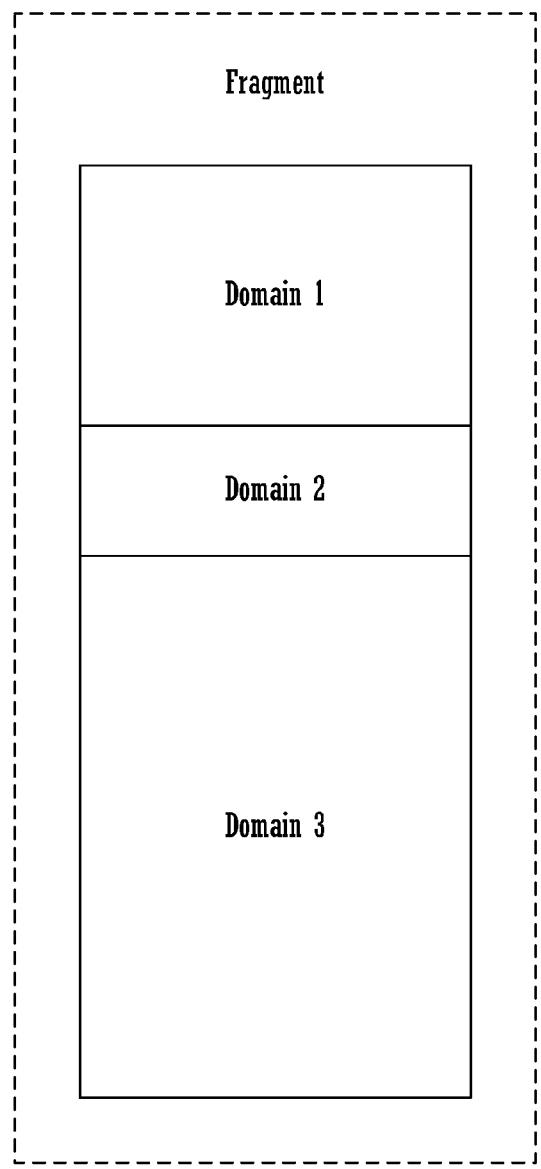
FIG. 10 shows the manner which fragments can be split into two or more domains in accordance with one embodiment of the present invention.

FIG. 10 shows the manner which fragments can be split into two or more domains in accordance with one embodiment of the present invention. FIG. 10 shows the manner in which a single fragment can be split into multiple domains. Domain splitting can be implemented via the address generation process. Domain splitting changes the manner in which load store checks have to be done within a fragment, since in this case they only have to be done per domain, as opposed to across the entire fragment. Domain splitting also is advantageous in that it can enable single ported memory to behave like multiport memory, where the single port is accessed per different domain.

Figure 11:
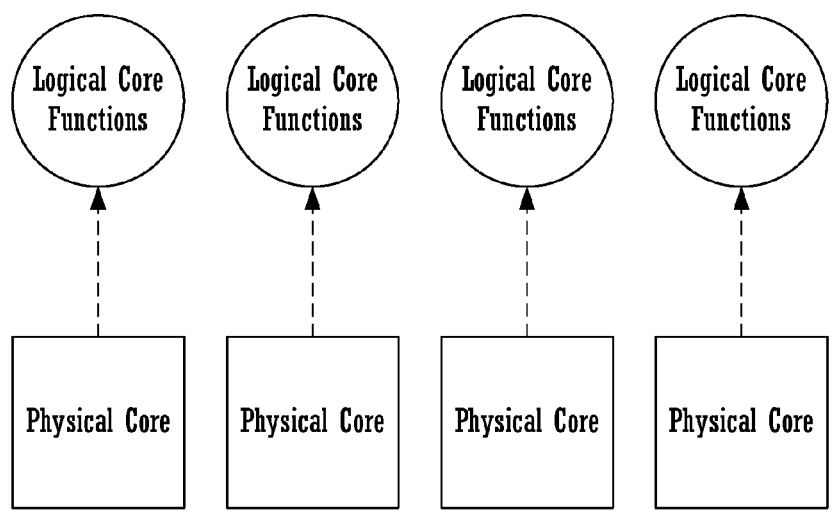
FIG. 11 shows a mode of operation of the processor wherein Virtual cores are configured as physical cores that correspond to logical cores in executing applications in accordance with one embodiment of the present invention.

FIG. 11 shows a mode of operation of the processor wherein the hardware resources of the partitionable engines are used to function like logical cores in executing applications in accordance with one embodiment of the present invention. In this embodiment, the hardware resources of the engines of the virtual cores are configured as physical cores. In the FIG. 11 mode, each physical core of is configured to function as a logical core. Multithreaded applications and multithreaded functionality is up to the threaded programmability of the software of the application.

Figure 12:
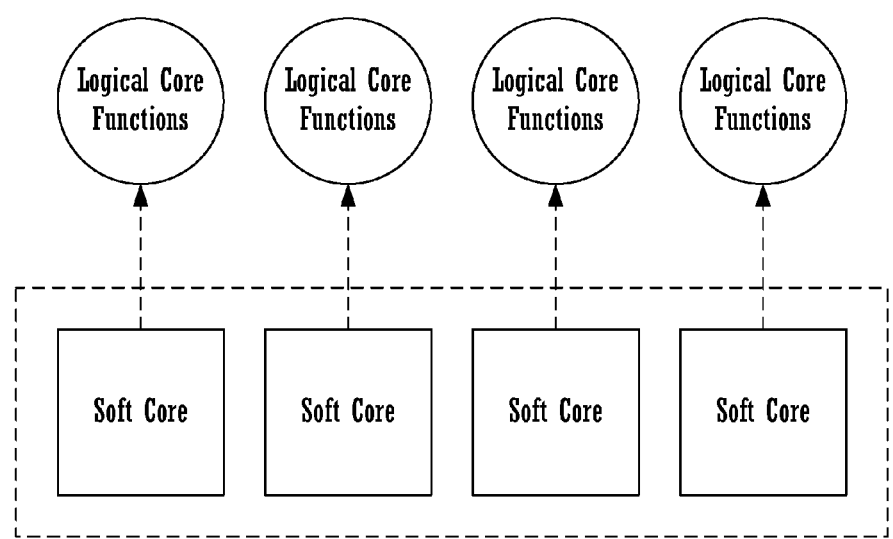
FIG. 12 shows a mode of operation of the processor wherein virtual cores are configured as soft cores that correspond to logical cores in executing applications in accordance with one embodiment of the present invention.

FIG. 12 shows a mode of operation of the processor wherein soft cores are used to function like logical cores in executing applications in accordance with one embodiment of the present invention. In this embodiment, the partitionable engines of virtual cores will support a plurality of soft cores. In the FIG. 12 mode, each soft core is configured to function as a logical core. Multithreaded applications and multithreaded functionality is up to the threaded programmability of the software of the application.

Figure 13:
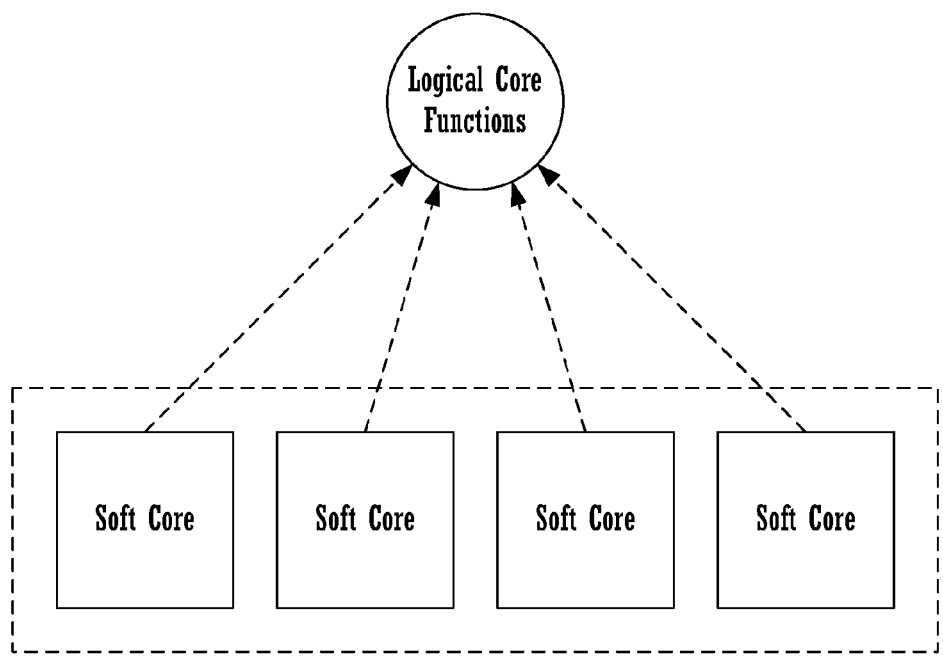
FIG. 13 shows a mode of operation of the processor wherein the virtual cores are configured as soft cores that correspond to a single logical core in executing applications in accordance with one embodiment of the present invention.

FIG. 13 shows a mode of operation of the processor wherein the soft cores are used to function like a single logical core in executing applications in accordance with one embodiment of the present invention. In the FIG. 13 mode, each soft core is configured to function as a single logical core. In such an implementation, a single threaded application has its instruction sequence divided up and allocated among the virtual cores where they are cooperatively executed to achieve high single threaded performance. In this manner, single threaded performance can scale with the addition of additional soft cores.

A number of strategies can be used in choosing the operating mode of the processor. For a processor having a large number of engines (e.g., 8 engines, 12 engines, etc.), a number of soft cores can be configured to function as a single logical core, while the remaining cores can operate in the other modes. This attribute allows an intelligent partition of resources to ensure maximum utilization of the hardware and/or minimal wasted power consumption. For example, in one embodiment, cores (e.g., soft or logical) can be allocated on a per thread basis depending upon the type of application that is executing.

Figure 14:
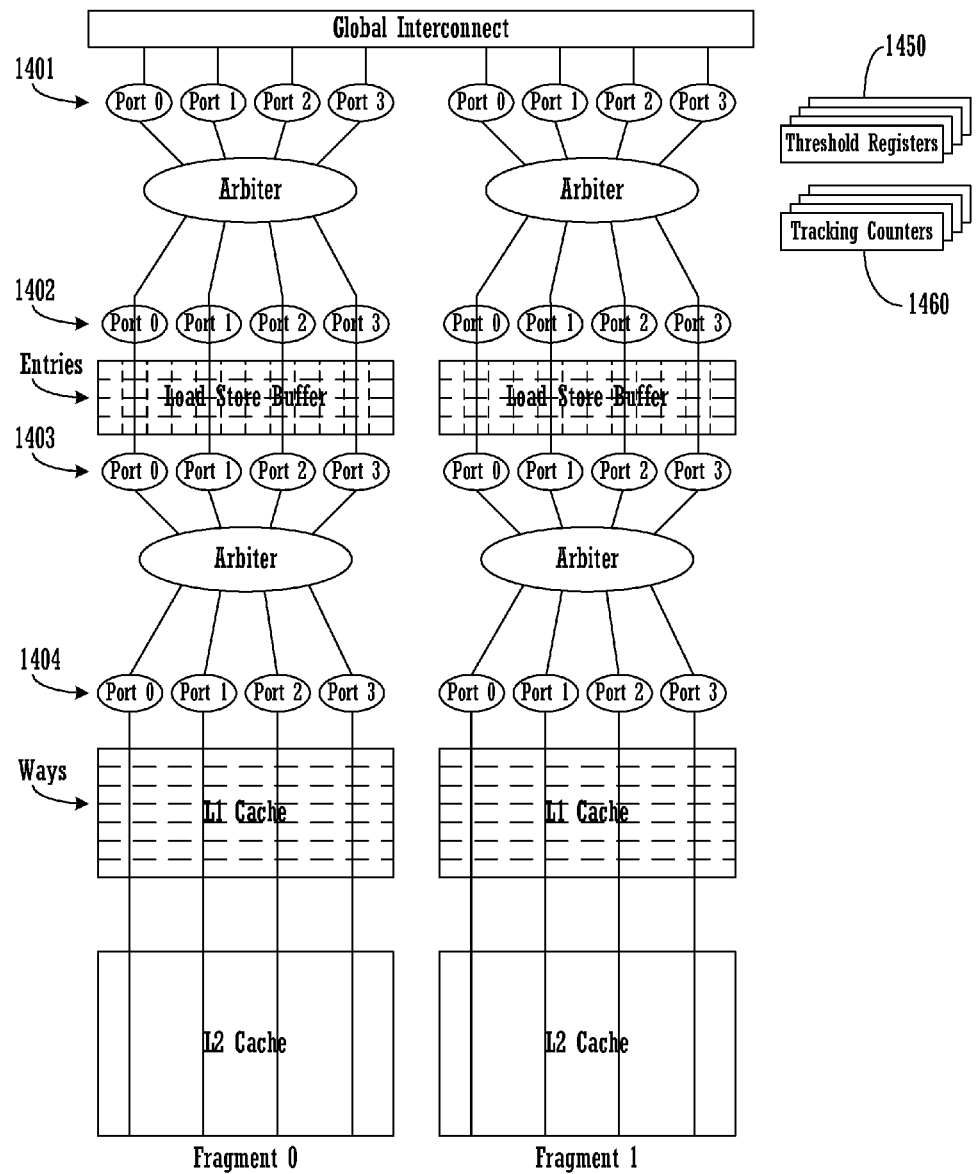
FIG. 14 shows an exemplary implementation of fragment segmentation being used to support logical core and virtual core functionality in accordance with one embodiment of the present invention.

FIG. 14 shows an exemplary implementation of fragment segmentation being used to support logical core and virtual core functionality in accordance with one embodiment of the present invention. As described above, the fragment segmentation allows the processor to be configured to support different virtual core execution modes, as described above.

The global interconnect allows cores' threads to access any of the ports 1401. It should be noted that the term "thread" as used herein refers to either a representation of instruction sequences from different logical cores, instruction sequences from the same logical core, or some mixture of the two.

The manner in which the threads utilize one of the ports 1401 to access the load store buffer is adjustable in accordance with the policies of the arbiters, as shown. Thus, a thread using any one of the ports 1401 can have a greater or lesser amount of access to the load store buffer via the ports 1402. The size of the allocation and the manner in which the allocation is managed is controlled by the arbiter. The arbiter can dynamically allocate access to the ports in accordance with demands of a particular thread.

The load store buffer is configured to have a plurality of entries spread across the ports. Access to the load store buffer is controlled by the arbiter. In this way, the arbiter can dynamically allocate entries in the load store buffer to the different threads.

FIG. 14 also shows arbiters on the ports between load store buffer and the L1 cache. Thus, as with the load store buffer described above, a thread using any one of the ports 1403 can have a greater or lesser amount of access to the L1 cache via the ports 1404. The size of the allocation and the manner in which the allocation is managed is controlled by the arbiter. The arbiter can dynamically allocate access to the ports in accordance with demands of a particular thread.

The L1 cache is configured to have a plurality of ways spread across the ports. Access to the L1 cache is controlled by the arbiter. In this way, the arbiter can dynamically allocate entries in the L1 cache to the different threads.

In one embodiment, the arbiters are configured to function with a plurality of counters 1460 that are used for tracking functionality and a plurality of threshold limit registers 1450 that provide a limiting function. The limiting function specifies the maximum resource allocation percentage for a given thread. The tracking function tracks the actual resources allocated to a given thread at any given time. These tracking and limiting functionalities affect the allocation of the number of per thread entries, ways, or ports for the load store buffer, L1 cache, L2 cache or the global interconnects. For example, the total number of entries in the load store buffer allocated for each thread can be dynamically checked against a variable threshold. This variable threshold can be updated in accordance with a given thread's forward progress. For example, in one embodiment, threads that are slowed down (e.g., large number or L2 misses, etc.) are quantified as making slow forward progress, and thus, their respective resource allocation thresholds are lowered, including the entries thresholds, the ways thresholds and the ports thresholds.

FIG. 14 also shows a shared L2 cache. In the present embodiment, the shared L2 cache has a fixed port arrangement without any arbitration between accesses coming from the L1 cache. Threads executing on the processor would all share access to the L2 cache and the resources of the L2 cache.

Figure 15:
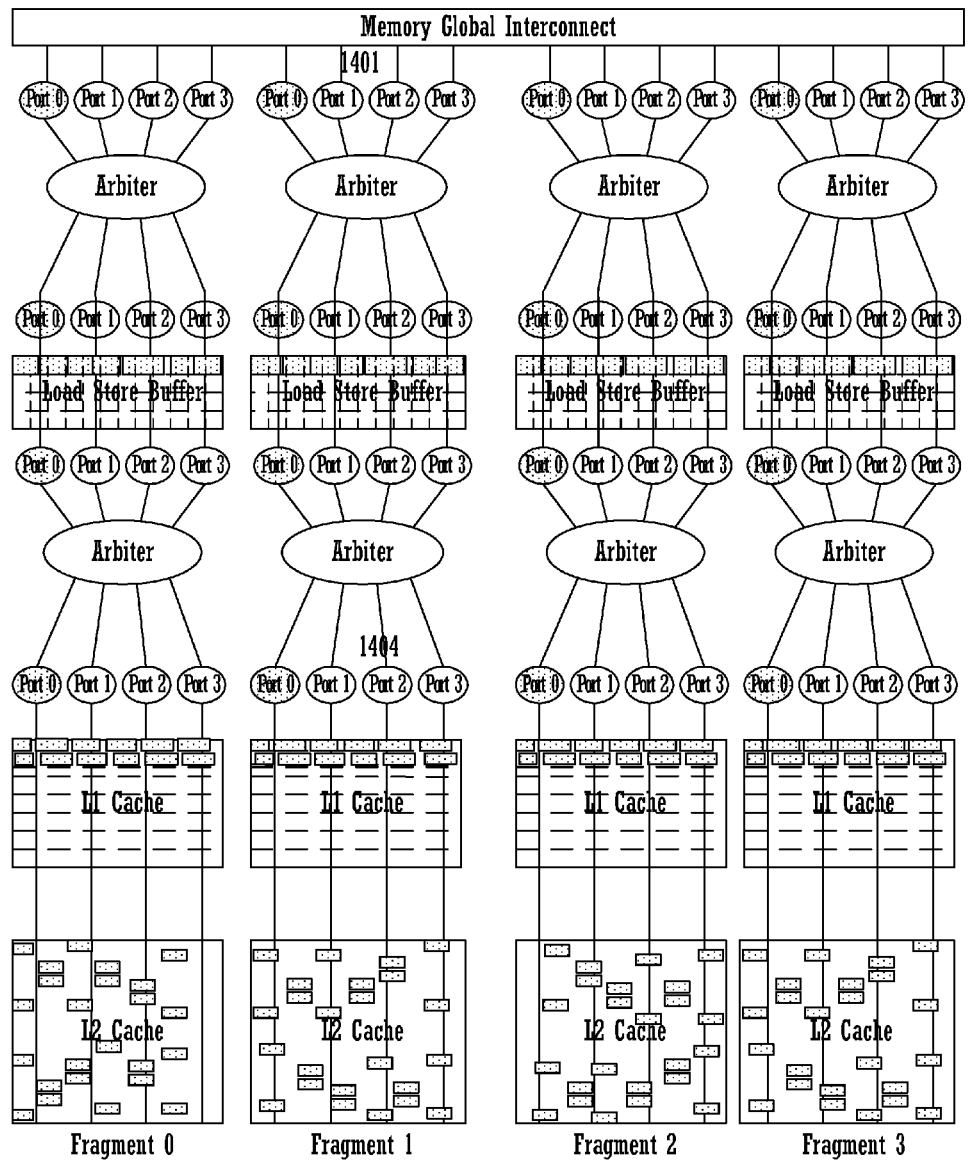
FIG. 15 shows a fragment memory of an exemplary four fragment processor implementing a many physicals to many logicals mode in accordance with one embodiment of the present invention.

FIG. 15 shows a fragment memory of an exemplary four fragment processor implementing a many physicals to many logicals mode in accordance with one embodiment of the present invention.

One example logical core and its relationship with the resources of the processor is shown by the shading on FIG. 15. In the FIG. 11 mode of operation, the many physical cores to many logical cores mode, wherein the physical cores are used to function like logical cores in executing applications, each logical core will be configured to have a fixed ratio of the resources of the load store buffer and the L1 cache. The ports can be specifically assigned to each thread or core. Entries in the load store buffer can be specifically reserved per thread or core. Ways within the L1 cache can be specifically reserved per thread or core. Multithreaded applications and multithreaded functionality is up to the threaded programmability of the software of the application. This is shown by the one logical core having an allocated port and an allocated portion of the store buffer and the L1 cache of each of the fragments. In this manner, the logical core comprises a fixed allocated slice of the resources of each fragment.

In one embodiment, in the many physical cores to many logical cores mode, the four fragments can be partitioned in accordance with the number of ports (e.g., ports 1401) that access each fragment. For example, in an embodiment where there are 6 ports per fragment, the resources of each fragment, and hence the resources of each partition will engine, can be divided in such a way to support 6 physical cores across the 4 fragments and the 4 partition double engines. Each partition can be allocated its own port. Similarly, the resources of the load store buffer and the L1 cache would be allocated in such a way to support 6 physical cores. For example, in an embodiment where the load store buffer has 48 entries, the 48 entries can be allocated such that there are 12 entries per physical core to support a mode where 4 physical cores are implemented, or they can be allocated such that there are 8 entries per physical core where 6 physical cores are implemented.

Figure 16:
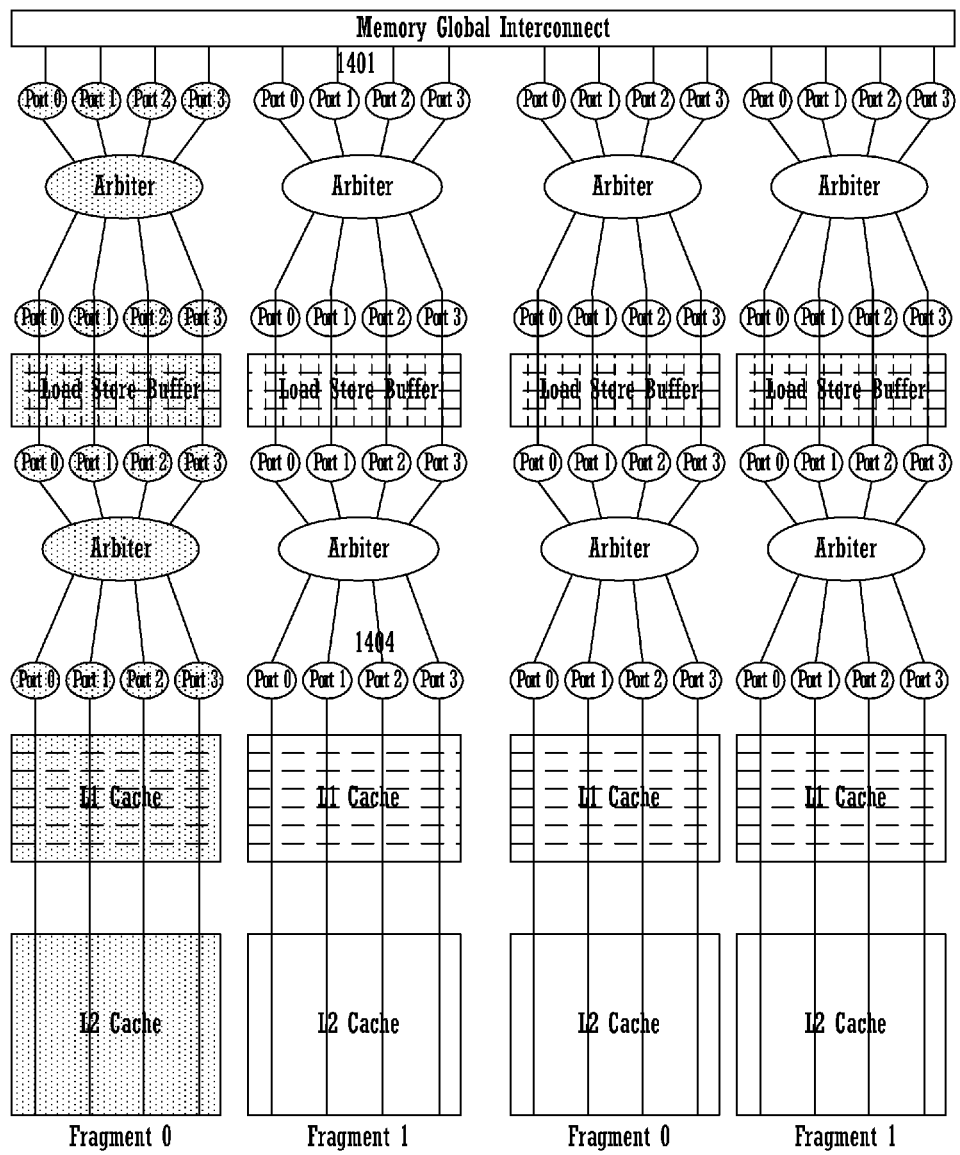
FIG. 16 shows a fragment memory of an exemplary four fragment processor implementing a many physicals to many logicals mode in accordance with an alternative embodiment of the present invention.

FIG. 16 shows a fragment memory of an exemplary four fragment processor implementing a many physicals to many logicals mode in accordance with an alternative embodiment of the present invention.

As with FIG. 15, the one example logical core and its relationship with the resources of the processor is shown by the shading on FIG. 16. In the FIG. 11 mode of operation, the many physical cores to many logical cores mode, an entire partition table engine is dedicated to support the execution of a single logical core. This is shown by the shading in FIG. 16. The physical resource is engine is used to function like logical core in executing applications.

Figure 17:
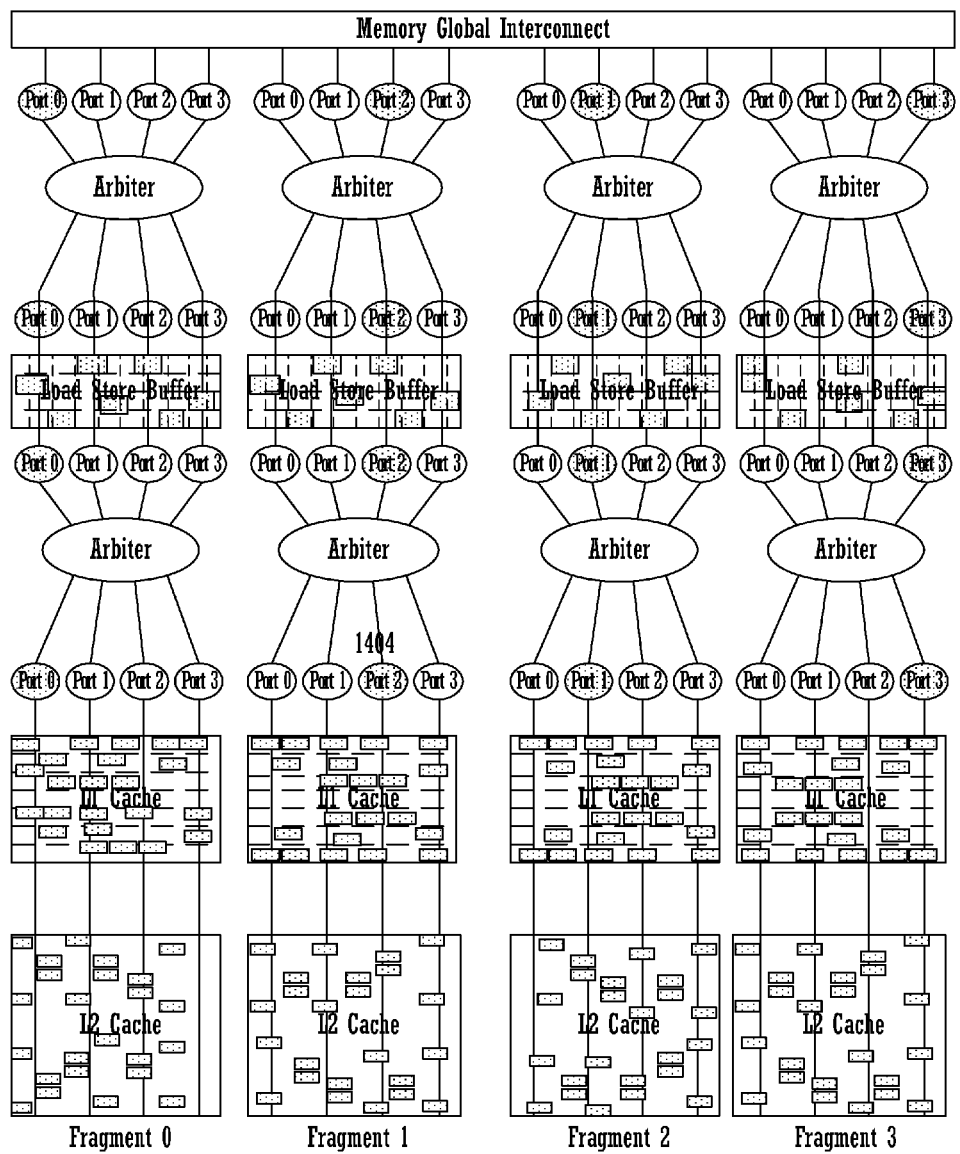
FIG. 17 shows a fragment memory of an exemplary four fragment processor implementing a many soft cores to many logical cores mode in accordance with one embodiment of the present invention.

FIG. 17 shows a fragment memory of an exemplary four fragment processor implementing a many soft cores to many logical cores mode in accordance with one embodiment of the present invention.

One example logical core and its relationship with the resources of the processor is shown by the shading on FIG. 17. In the FIG. 12 mode of operation, the many soft cores to many logicals mode, where virtual cores are used to function like logical cores in executing applications, the size of the allocation of the resources of the load store buffer and the manner in which the allocation is managed is controlled by the arbiter. The arbiter can dynamically allocate access to the ports in accordance with demands of a particular thread or core. Similarly, the size of the allocation of the resources of the L1 cache and the manner in which the allocation is managed is controlled by the arbiter. The arbiter can dynamically allocate access to the ports in accordance with demands of a particular thread or core. Thus, at any given instance the logical thread/core (e.g. shaded) can use different arbiters and different ports.

In this manner, access to the resources of the load store buffer and access to the resources of the L1 cache can be more policy driven and can be more based on the needs of individuals threads or cores making forward progress. This is shown by the one logical core having a dynamically allocated port and a dynamically allocated portion of the store buffer and the L1 cache of each of the fragments. In this manner, the logical core comprises a non-fixed, dynamically allocated slice of the resources of each fragment.

Figure 18:
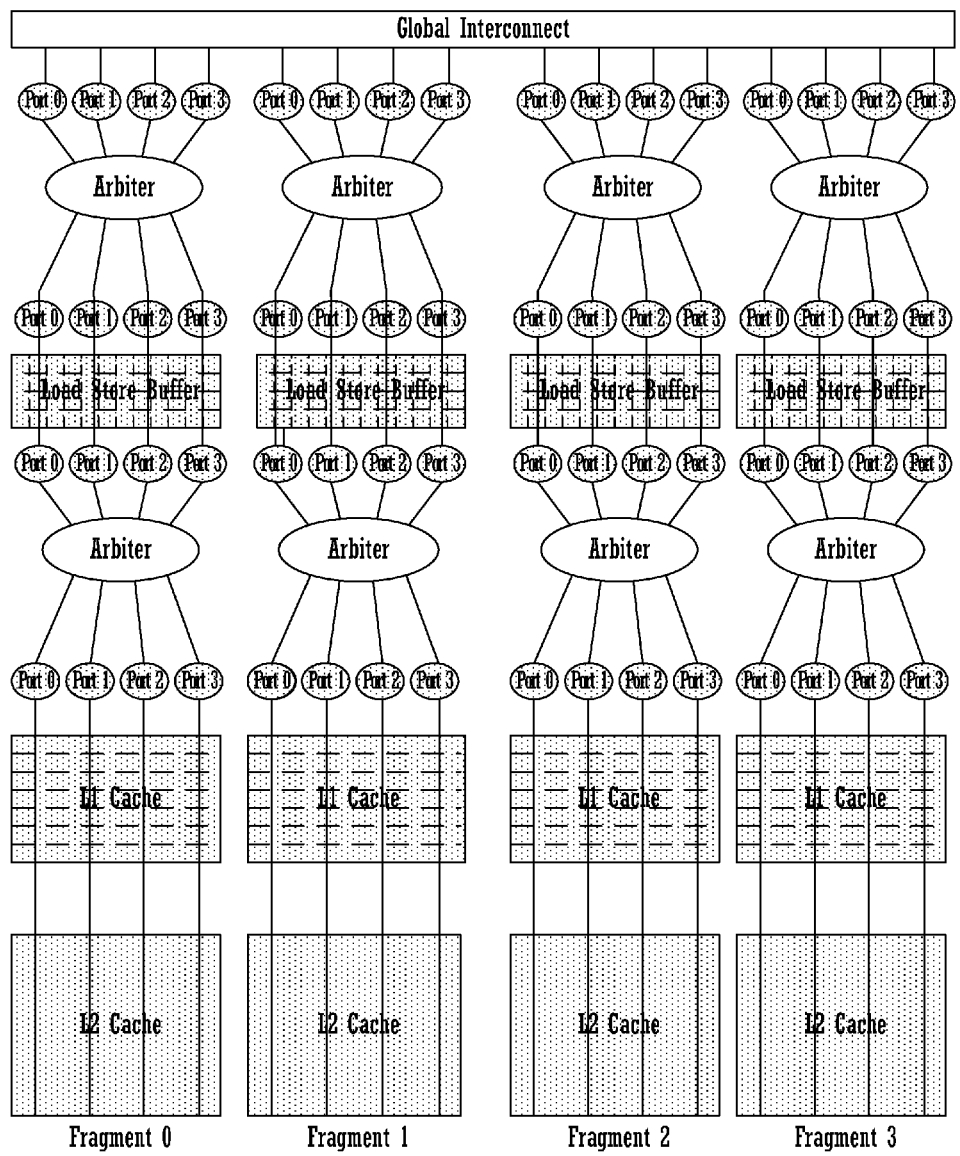
FIG. 18 shows a fragment memory of an exemplary four fragment processor implementing a many soft cores to one logical core mode in accordance with one embodiment of the present invention.

FIG. 18 shows a fragment memory of an exemplary four fragment processor implementing a many soft cores to one logical core mode in accordance with one embodiment of the present invention.

In the FIG. 13 mode of operation, the many soft cores to one logical core mode, wherein the soft cores are used to function like a single logical core in executing applications, each of the soft cores is configured to function cooperatively with the other soft cores as a single logical core. A single thread or core has all the resources of the load store buffers and all of the resources of the L1 caches. In such an implementation, a single threaded application has its instruction sequence divided up and allocated among the soft cores where they are cooperatively executed to achieve high single threaded performance. In this manner, single threaded performance can scale with the addition of additional soft cores. This is shown in FIG. 18 where the one example logical core and its relationship with the resources of the processor is shown by the shading of all of the resources of the processor.

Figure 19:
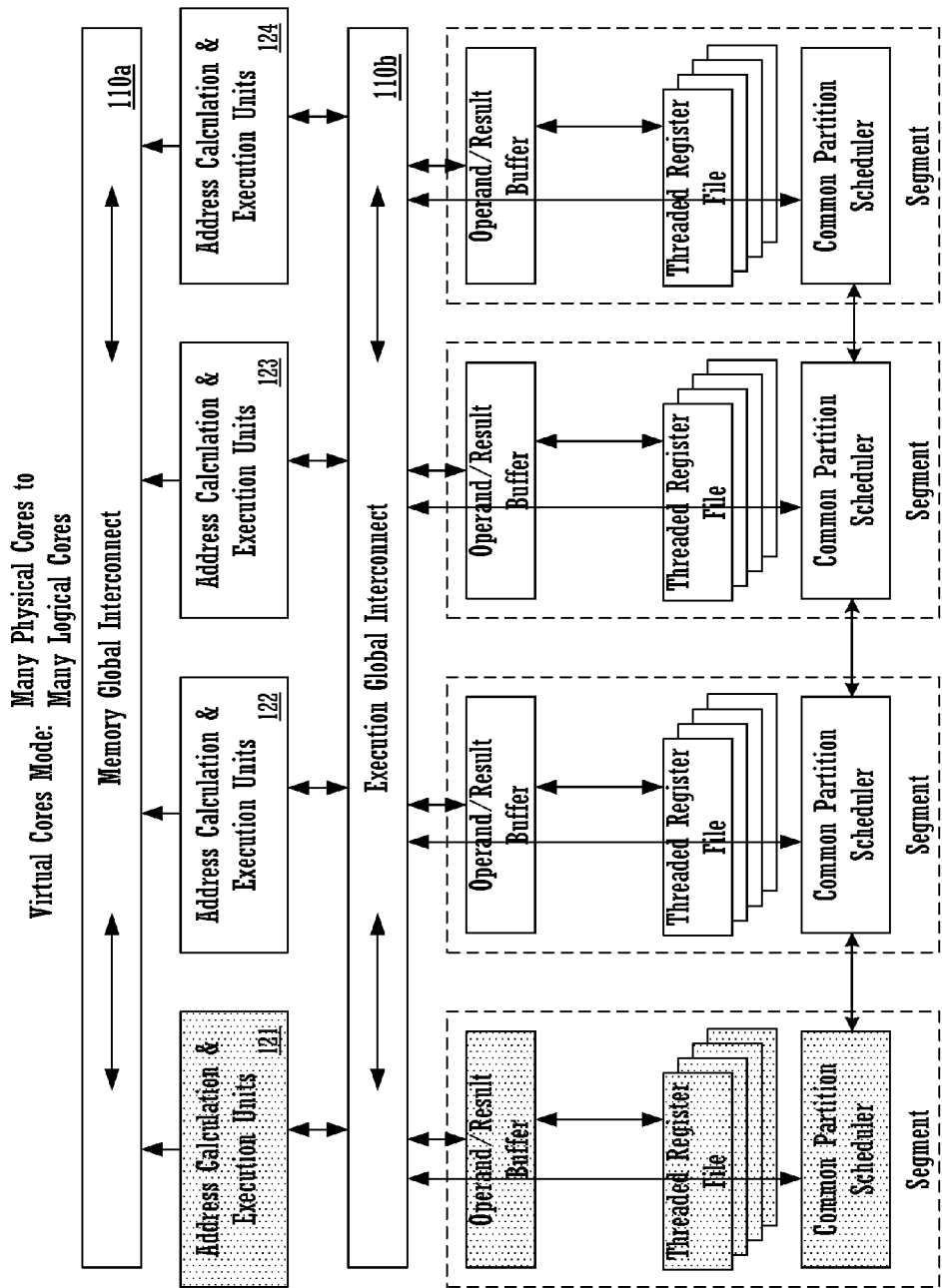
FIG. 19 shows address calculation and execution units, operand/result buffers, threaded register files, and common partition schedulers of an exemplary four fragment processor implementing a physicals to logicals mode in accordance with one embodiment of the present invention.

FIG. 19 shows address calculation and execution units, operand/result buffers, threaded register files, and common partition schedulers of an exemplary four fragment processor implementing a many physicals to many logicals mode in accordance with one embodiment of the present invention.

One example logical core and its relationship with the resources of the processor is shown by the shading on FIG. 19. In the FIG. 11 mode of operation, the many physical cores to many logical cores mode, wherein the physical cores are used to function like logical cores in executing applications, each logical core will be configured to have a fixed ratio of the resources of the address calculation units, operand/result buffers, threaded register files, and common partition scheduler. Multithreaded applications and multithreaded functionality is up to the threaded programmability of the software of the application. This is shown by the one logical core having an allocated address calculation and execution unit, an allocated threaded register file and an allocated common partition scheduler. In this manner, the logical core comprises a fixed allocated segment. However, in one embodiment, in this mode of operation, the address calculation and execution units can still be shared (e.g., meaning each of the address calculation and execution units would be un-shaded).

Figure 20:
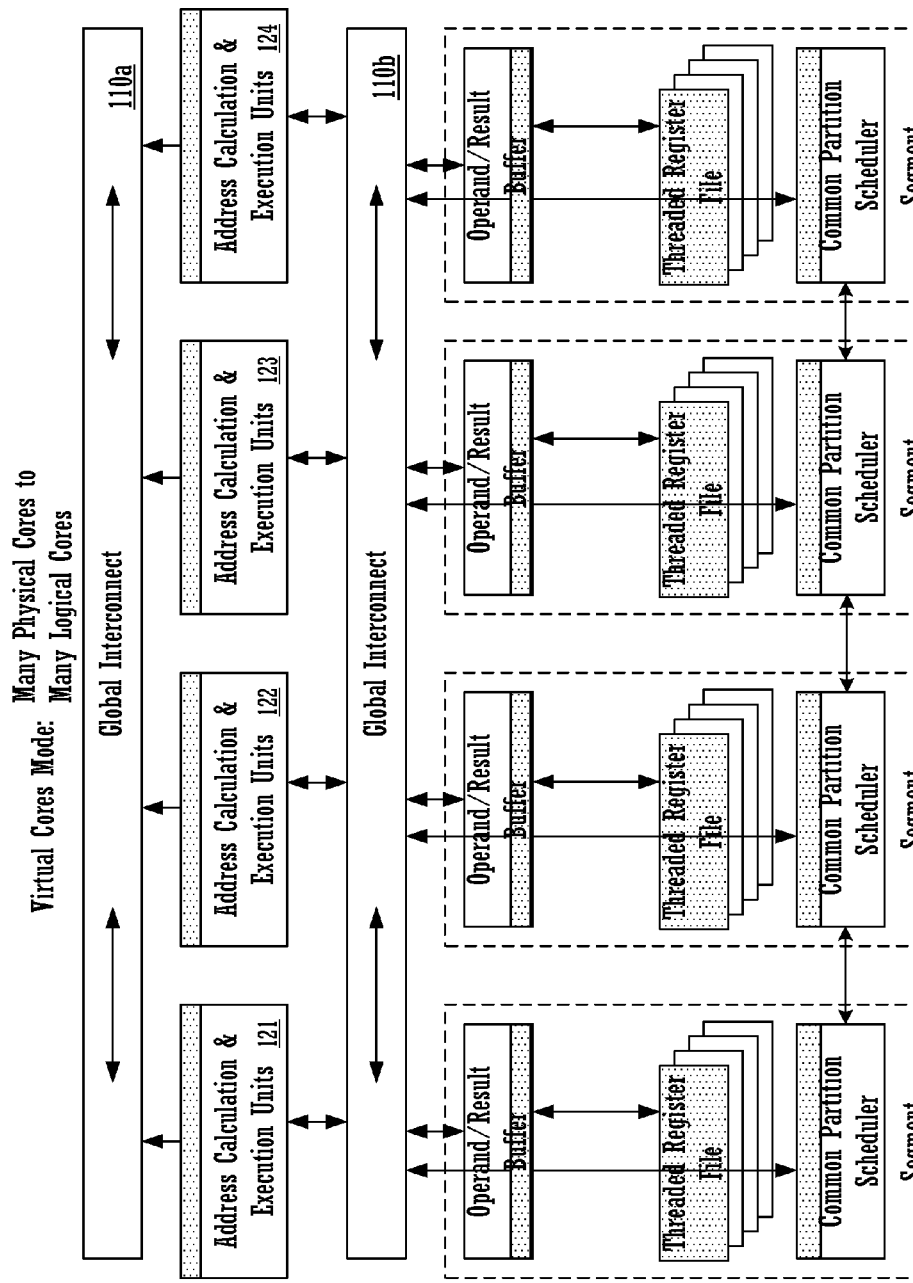
FIG. 20 shows an alternative implementation for the address calculation and execution units, operand/result buffers, threaded register files, and common partition schedulers of an exemplary four fragment processor to implement a many physicals to many logicals mode in accordance with one embodiment of the present invention.

FIG. 20 shows an alternative implementation for the address calculation and execution units, operand/result buffers, threaded register files, and common partition schedulers of an exemplary four fragment processor to implement a many physicals to many logicals mode in accordance with one embodiment of the present invention.

One example logical core and its relationship with the resources of the processor is shown by the shading on FIG. 20. In the FIG. 20 embodiment however, the resources of a physical core is spread across each of the segments and each of the partitionable engines. This is shown by the one logical core having an allocated portion of the address calculation and execution units, an allocated portion of the threaded register files and an allocated portion of common partition schedulers across each of the segments. Additionally, FIG. 20 shows how the one logical core would have been allocated portion of the resources of each of the address calculation execution units. In this manner, the logical core comprises a fixed allocated portion of each of the segments.

Figure 21:
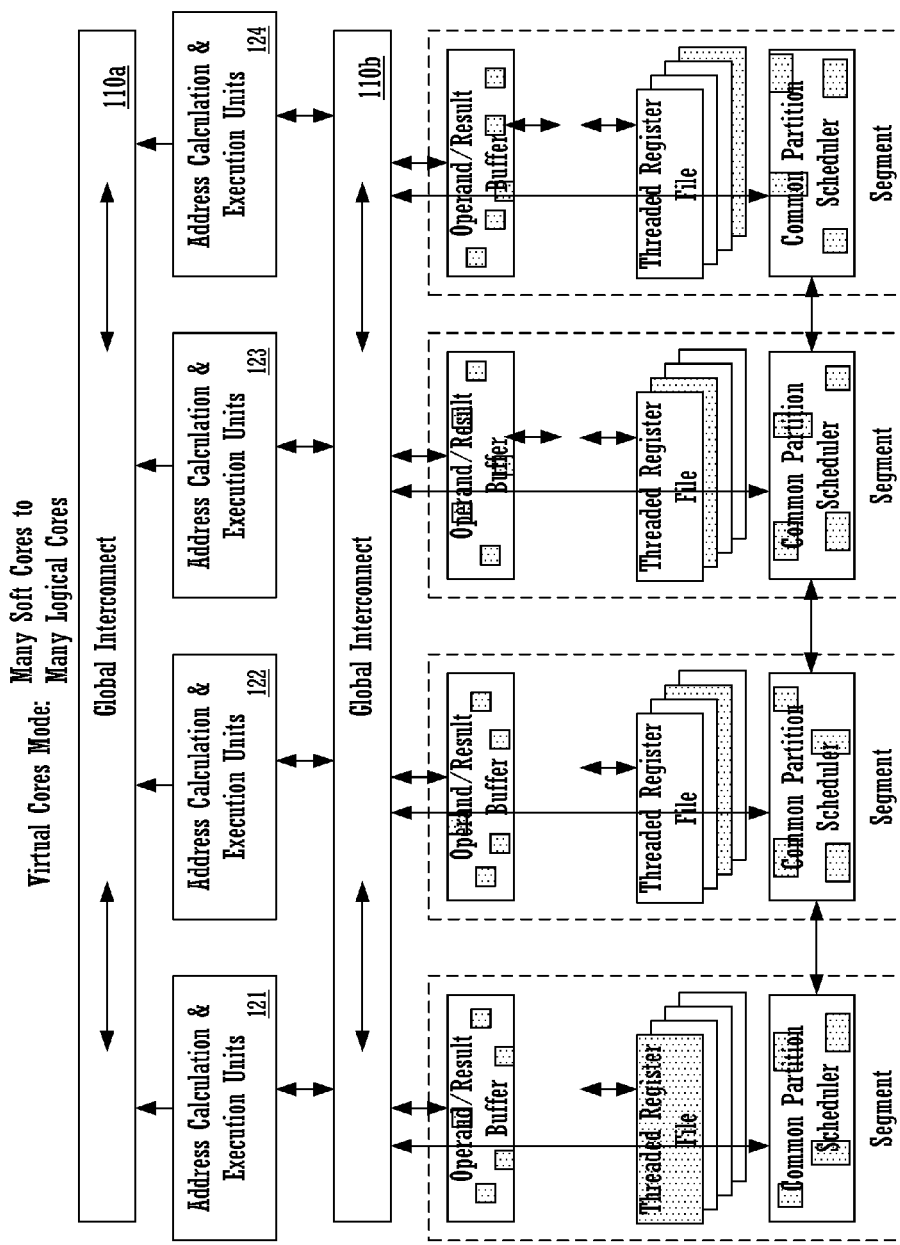
FIG. 21 shows address calculation and execution units, register files, and common partition schedulers of an exemplary four fragment processor implementing a many soft cores to many logicals mode in accordance with one embodiment of the present invention.

FIG. 21 shows address calculation and execution units, register files, and common partition schedulers of an exemplary four fragment processor implementing a many soft cores to many logical cores mode in accordance with one embodiment of the present invention.

One example logical core and its relationship with the resources of the processor is shown by the shading on FIG. 21. In the FIG. 12 mode of operation, the many soft cores to many logical cores mode, wherein the soft cores are used to function like logical cores in executing applications, each logical core will be configured to have a shared access to any one the address calculation units, and a dynamic allocated portion of the operand/result buffers, threaded register files, and common partition scheduler. Multithreaded applications and multithreaded functionality is up to the threaded programmability of the software of the application.

Figure 22:
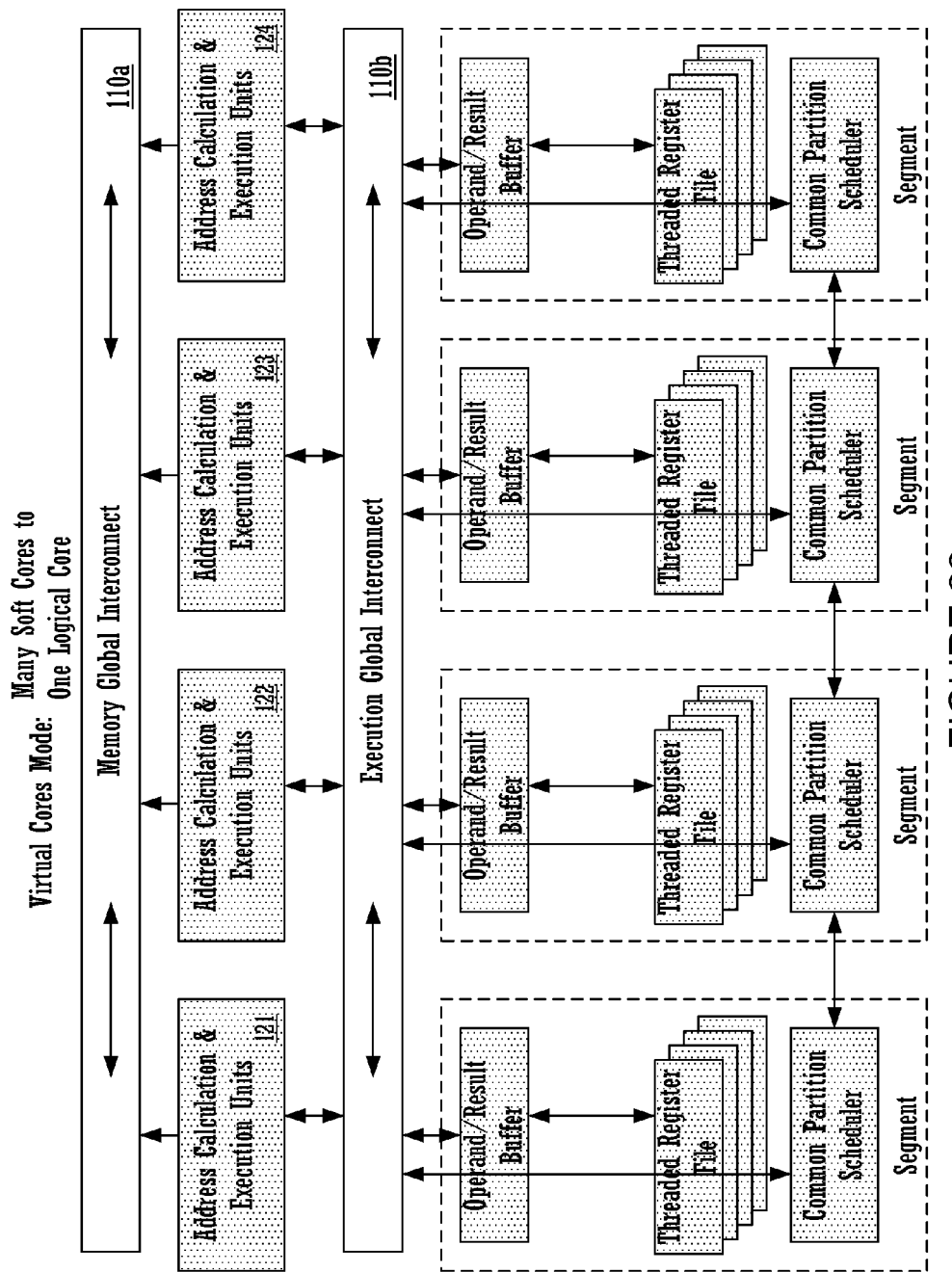
FIG. 22 shows address calculation and execution units, register files, and common partition schedulers of an exemplary four fragment processor implementing a many soft cores to one logical core mode in accordance with one embodiment of the present invention.

FIG. 22 shows address calculation and execution units, register files, and common partition schedulers of an exemplary four fragment processor implementing a many soft cores to one logical core mode in accordance with one embodiment of the present invention.

One example logical core and its relationship with the resources of the processor is shown by the shading on FIG. 22. In the FIG. 13 mode of operation, the many soft cores to one logical core mode, wherein the soft cores are used to function like a single logical core in executing applications, each logical core will be configured to have a shared access to all of the address calculation units, and all of the operand/result buffers, threaded register files, and common partition schedulers. In such an implementation, a single threaded application has its instruction sequence divided up and allocated among the virtual cores where they are cooperatively executed to achieve high single threaded performance. In this manner, single threaded performance can scale with the addition of additional soft cores.

Figure 23:
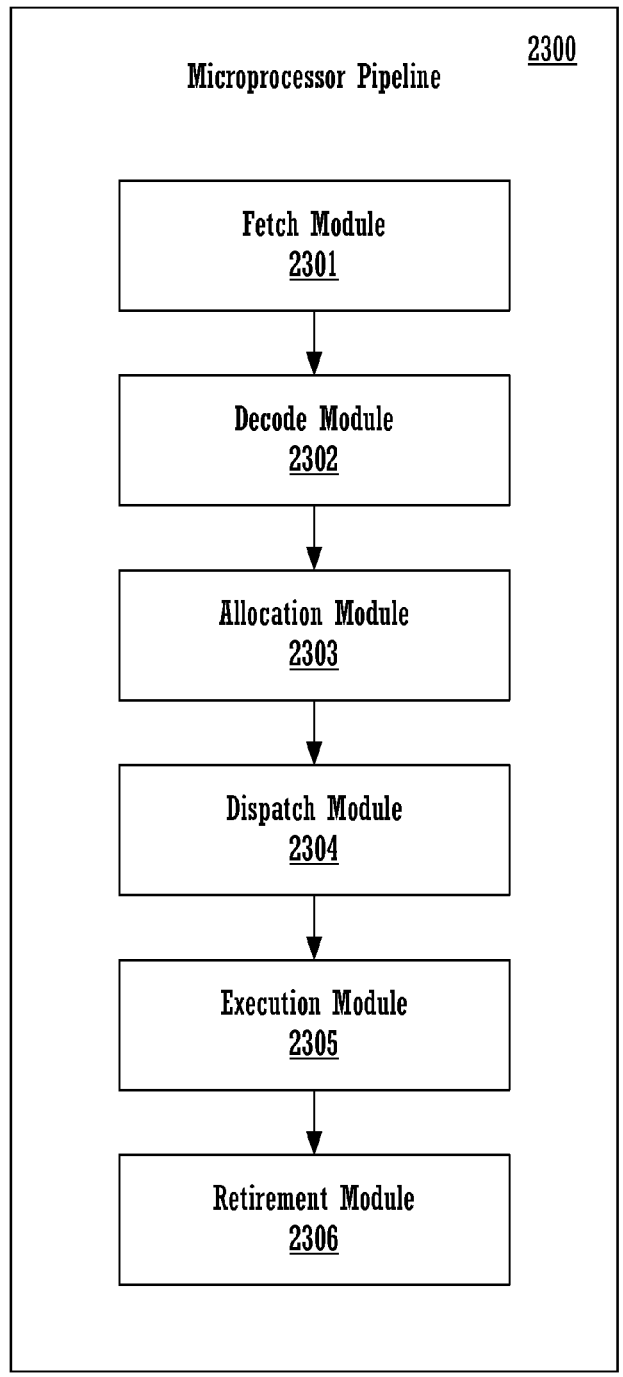
FIG. 23 shows a diagram of an exemplary microprocessor pipeline in accordance with one embodiment of the present invention.

FIG. 23 shows a diagram of an exemplary microprocessor pipeline 2300 in accordance with one embodiment of the present invention. The microprocessor pipeline 2300 includes a fetch module 2301 that implements the functionality of the process for identifying and extracting the instructions comprising an execution, as described above. In the FIG. 23 embodiment, the fetch module is followed by a decode module 2302, an allocation module 2303, a dispatch module 2304, an execution module 2305 and a retirement modules 2306. It should be noted that the microprocessor pipeline 2300 is just one example of the pipeline that implements the functionality of embodiments of the present invention described above. One skilled in the art would recognize that other microprocessor pipelines can be implemented that include the functionality of the decode module described above.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A system for executing instructions using a plurality of register file segments for a processor, comprising:
    a global front end scheduler for receiving an incoming instruction sequence, wherein the global front end scheduler partitions the incoming instruction sequence into a plurality of code blocks of instructions;
    a plurality of virtual cores of the processor coupled to receive code blocks allocated by the global front end scheduler, wherein each virtual core comprises a respective subset of resources of a plurality of partitionable engines, wherein resources of each partitionable engine are operable to be partitioned to instantiate a virtual core with partitioned resources of other partitionable engines, wherein communication between resources of each of said plurality of partitionable engines is supported by a global interconnection structure, and wherein the code blocks are executed by using the partitionable engines in accordance with a virtual core mode; and
    a plurality of register file segments coupled to the partitionable engines for providing data storage, wherein the global interconnection structure links each of the plurality of register file segments to each of the plurality of partitionable engines.

2. The system of claim 1 wherein the plurality of register file segments implement an execution mode wherein a subset of physical resources of each register file segment are allocated to support execution of a single logical thread of a logical core.

3. The system of claim 2, wherein each register file segment implements a portion of a plurality of logical cores.

4. The system of claim 1, wherein the plurality of register file segments implement an execution mode wherein physical resources of each register file segment are dynamically allocated in accordance with an adjustable threshold to support execution of a single logical thread of a single logical core.

5. The system of claim 4, wherein the plurality of register file segments implement a portion of a plurality of logical cores.

6. The system of claim 1, wherein the plurality of register file segments implement an execution mode wherein the set of physical resources of each register file segment are allocated to support execution of a single logical thread.

7. The system of claim 1, wherein each register file segment further comprises a common partition scheduler, an operand and result buffer and a threaded register file.

8. The system of claim 1, wherein the global interconnection structure comprises a routing matrix operable to allow the plurality of partitionable engines to access data stored at any point in the plurality of register file segments.

9. A system for executing instructions using a plurality of register file segments for a processor, comprising:
   a global front end scheduler for receiving an incoming instruction sequence, wherein the global front end scheduler partitions the incoming instruction sequence into a plurality of code blocks of instructions and generates a plurality of inheritance vectors describing interdependencies between instructions of the code blocks;
   a plurality of virtual cores of the processor coupled to receive code blocks allocated by the global front end scheduler, wherein each virtual core comprises a respective subset of resources of a plurality of partitionable engines, wherein resources of each partitionable engine are operable to be partitioned to instantiate a virtual core with partitioned resources of other partitionable engines, wherein communication between resources of each of said plurality of partitionable engines is supported by a global interconnection structure, and wherein the code blocks are executed by using the partitionable engines in accordance with a virtual core mode and in accordance with the respective inheritance vectors; and
   a plurality of register file segments coupled to the partitionable engines for providing data storage, wherein the global interconnection structure links each of the plurality of register file segments to each of the plurality of partitionable engines.

10. The system of claim 9 wherein the plurality of register file segments implement an execution mode wherein a subset of physical resources of each register file segment are allocated to support execution of a single logical thread of a logical core.

11. The system of claim 10, wherein each register file segment implements a portion of a plurality of logical cores.

12. The system of claim 9, wherein the plurality of register file segments implement an execution mode wherein physical resources of each register file segment are dynamically allocated in accordance with an adjustable threshold to support execution of a single logical thread of a single logical core.

13. The system of claim 12, wherein the plurality of register file segments implement a portion of a plurality of logical cores.

14. The system of claim 9, wherein the plurality of register file segments implement an execution mode wherein the set of physical resources of each register file segment are allocated to support execution of a single logical thread.

15. The system of claim 9, wherein each register file segment further comprises a common partition scheduler, an operand and result buffer and a threaded register file.

16. The system of claim 9, wherein the global interconnection structure comprises a routing matrix operable to allow the plurality of partitionable engines to access data stored at any point in the plurality of register file segments.

17. A processor for executing instructions using a plurality of register file segments, comprising:
   a global front end scheduler for receiving an incoming instruction sequence, wherein the global front end scheduler allocates incoming the instruction sequence into a plurality of code segments of instructions, and generates a plurality of inheritance vectors describing interdependencies between instructions of the code segments;
   a plurality of virtual cores of the processor coupled to receive code blocks allocated by the global front end scheduler, wherein each virtual core comprises a respective subset of resources of a plurality of partitionable engines wherein resources of each partitionable engine are operable to be partitioned to instantiate a virtual core with partitioned resources of other partitionable engines, wherein communication between resources of each of said plurality of partitionable engines is supported by a global interconnection structure, and wherein the code blocks are executed by using the partitionable engines in accordance with a virtual core mode and in accordance with the respective inheritance vectors;
   a plurality execution units coupled to the global front scheduler for executing the code segments in accordance with respective inheritance vectors; and
   a plurality of register file segments coupled to the execution units for providing data storage, wherein the global interconnection structure links each of the plurality of register file segments to each of the plurality of execution units.

18. The processor of claim 17 wherein the plurality of register file segments implement an execution mode wherein a subset of physical resources of each register file segment are allocated to support execution of a single logical thread of a logical core.

19. The processor of claim 18, wherein each register file segment implements a portion of a plurality of logical cores.

20. The processor of claim 17, wherein the plurality of register file segments implement an execution mode wherein physical resources of each register file segment are dynamically allocated in accordance with an adjustable threshold to support execution of a single logical thread of a single logical core.

21. The processor of claim 20, wherein the plurality of register file segments implement a portion of a plurality of logical cores.

22. The processor of claim 17, wherein the plurality of register file segments implement an execution mode wherein the set of physical resources of each register file segment are allocated to support execution of a single logical thread.

23. The processor of claim 17, wherein each register file segment further comprises a common partition scheduler, an operand and result buffer and a threaded register file.

24. The processor of claim 17, wherein the global interconnection structure comprises a routing matrix operable to allow the plurality of execution units to access data stored at any point in the plurality of register file segments.

* * * * *